(12) United States Patent
Imeshev et al.

(10) Patent No.: US 8,040,929 B2
(45) Date of Patent: Oct. 18, 2011

(54) OPTICAL PARAMETRIC AMPLIFICATION, OPTICAL PARAMETRIC GENERATION, AND OPTICAL PUMPING IN OPTICAL FIBERS SYSTEMS

(75) Inventors: Gennady Imeshev, Ann Arbor, MI (US); Martin Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 51 days.

(21) Appl. No.: 11/091,015

(22) Filed: Mar. 25, 2005

(65) Prior Publication Data
US 2005/0238070 A1    Oct. 27, 2005

Related U.S. Application Data

(60) Provisional application No. 60/556,101, filed on Mar. 25, 2004, provisional application No. 60/624,140, filed on Nov. 1, 2004.

(51) Int. Cl.
*H01S 3/10* (2006.01)

(52) U.S. Cl. ............................................. 372/21; 372/30

(58) Field of Classification Search ..................... 372/21, 372/30
See application file for complete search history.

(56) References Cited

U.S. PATENT DOCUMENTS

| | | | |
|---|---|---|---|
| 5,499,134 A | 3/1996 | Galvanauskas et al. | |
| 5,627,848 A | 5/1997 | Fermann et al. | |
| 5,666,373 A | 9/1997 | Sharp et al. | |
| 5,815,307 A | 9/1998 | Arbore et al. | |
| 5,818,630 A | 10/1998 | Fermann et al. | |
| 5,847,863 A | 12/1998 | Galvanauskas et al. | |
| 5,862,287 A | 1/1999 | Stock et al. | |
| 5,867,304 A | 2/1999 | Galvanauskas et al. | |
| 5,880,877 A * | 3/1999 | Fermann et al. | 359/341.31 |
| 6,014,249 A | 1/2000 | Fermann et al. | |

(Continued)

FOREIGN PATENT DOCUMENTS

EP    1724634    11/2006

(Continued)

OTHER PUBLICATIONS

Abdolvand, et al., *Ultra-efficient Ho: YAG laser end-pumped by a cladding-pumped Tm-doped silica fiber laser*, ASSP 2003, OSA TOPS, vol. 83, pp. 7-12.

(Continued)

*Primary Examiner* — Tod T Van Roy
(74) *Attorney, Agent, or Firm* — Knobbe, Martens, Olson & Bear, LLP

(57) ABSTRACT

Embodiments described herein include a system for producing ultrashort tunable pulses based on ultra broadband OPA or OPG in nonlinear materials. The system parameters such as the nonlinear material, pump wavelengths, quasi-phase matching periods, and temperatures can be selected to utilize the intrinsic dispersion relations for such material to produce bandwidth limited or nearly bandwidth limited pulse compression. Compact high average power sources of short optical pulses tunable in the wavelength range of 1800-2100 nm and after frequency doubling in the wavelength range of 900-1050 nm can be used as a pump for the ultra broadband OPA or OPG. In certain embodiments, these short pump pulses are obtained from an Er fiber oscillator at about 1550 nm, amplified in Er fiber, Raman-shifted to 1800-2100 nm, stretched in a fiber stretcher, and amplified in Tm-doped fiber. To produce short pulses in the 900-1050 nm wavelength range, the pulses are frequency-doubled with a chirped frequency doubler for nearly bandwidth-limited output.

39 Claims, 18 Drawing Sheets

U.S. PATENT DOCUMENTS

| | | | |
|---|---|---|---|
| 6,181,463 B1 | 1/2001 | Galvanauskas et al. | |
| 6,195,372 B1 | 2/2001 | Brown | |
| 6,198,568 B1* | 3/2001 | Galvanauskas et al. | 359/332 |
| 6,208,458 B1* | 3/2001 | Galvanauskas et al. | 359/345 |
| 6,272,156 B1 | 8/2001 | Reed et al. | |
| 6,359,914 B1* | 3/2002 | Powers et al. | 372/25 |
| 6,728,273 B2 | 4/2004 | Perry | |
| 6,804,287 B2 | 10/2004 | Backus | |
| 6,870,664 B2 | 3/2005 | Jovanovic | |
| 6,885,683 B1 | 4/2005 | Fermann et al. | |
| 7,088,756 B2 | 8/2006 | Fermann | |
| 7,257,302 B2 | 8/2007 | Fermann | |
| 7,394,591 B2 | 7/2008 | Harter | |
| 7,414,780 B2 | 8/2008 | Fermann et al. | |
| 2004/0057682 A1 | 3/2004 | Nicholson et al. | |
| 2004/0213302 A1 | 10/2004 | Fermann et al. | |
| 2004/0263950 A1 | 12/2004 | Fermann et al. | |
| 2005/0018714 A1 | 1/2005 | Fermann et al. | |
| 2005/0041702 A1 | 2/2005 | Fermann et al. | |
| 2005/0105865 A1 | 5/2005 | Fermann et al. | |
| 2005/0157760 A1* | 7/2005 | Rice et al. | 372/6 |
| 2005/0232318 A1 | 10/2005 | Kawanaka | |
| 2005/0238070 A1 | 10/2005 | Imeshev | |
| 2005/0271094 A1 | 12/2005 | Miller | |
| 2007/0086713 A1 | 4/2007 | Ingmar et al. | |
| 2007/0297469 A1 | 12/2007 | Brown | |
| 2009/0201575 A1 | 8/2009 | Fermann et al. | |
| 2009/0244695 A1 | 10/2009 | Marcinkevicius et al. | |

FOREIGN PATENT DOCUMENTS

| | | |
|---|---|---|
| WO | WO2004000163 | 12/2003 |
| WO | WO 2005/017955 | 2/2005 |

OTHER PUBLICATIONS

Baltuška, et al., *Visible pulse compression to a 4 fs by optical parametric amplification and programmable dispersion control*, Opt. Lett. 27, vol. 27, No. 5, Mar. 1, 2002, pp. 306-308.

Chen, et al., *Characterization of Two-photon excitation Fluorescence Lifetime Imaging Microscopy for Protein Localization*, Microscopy Research and Technique, 63, pp. 72-80 (2004).

Dawson, et al., *Scalable 11W 938nm $Nd^{3+}$ doped fiber laser*, ASSP 2004, paper MD8.

Eimerl, *Quadrature Frequency Conversion*, IEEE Journal of Quantum Electronics, vol. QE-23, No. 8, 1987, pp. 1361-1371.

Ei-Sherif, et al., *Analysis and Optimization of Q-Switched Operation of a $Tm^{3+}$-Doped Silica Fiber Laser Operating at 2μm*, IEEE Journal of Quantum Electronics, vol. 39, No. 6, Jun. 2003, pp. 759-765.

Gale, et al., *Sub-20-fs tunable pulses in the visible from an 82-MHz optical parametric oscillator*, Optics Letters, vol. 20, No. 14, Jul. 15, 1995, pp. 1562-1564.

Galvanauskas, et al, *Fiber-laser-based femtosecond parametric generator in bulk periodically poled $LiNbO_3$*, Optics Letters, vol. 22, No. 2, Jan. 15, 1997, pp. 105-107.

Goldberg, et al., *Highly efficient 4-W Yb-doped fiber amplifier pumped by a broad-stripe laser diode*, Optics Letters, vol. 24, No. 10, May 15, 1999, pp. 673-675.

Gomes, et al., *Low-pump-power, short-fiber copropagating dual-pumped (800 and 1050 nm) thulium-doped fiber amplifier*, Optics Letters, vol. 28, No. 5, Mar. 1, 2003, pp. 334-336.

Guerreiro, et al., *PbS quantum-dot doped glasses as saturable absorbers for mode locking of a Cr:forsterite laser*, Appl. Phys. Left. 71 (12), Sep. 12, 1997, pp. 1595-1597.

Hori, et al., *Flatly broadened, wideband and low noise supercontinuum generation in highly nonlinear hybrid fiber*, Optics Express 317, vol. 12, No. 2, Jan. 26, 2004, pp. 317-324.

Hugonnot, et al., *Amplified femtosecond laser system based on continuum generation and chirped pulse parametric amplification*, Advanced Solid-State Photonics, 2004, paper MC3.

Imeshev, et al., *Ultrashort-pulse second-harmonic generation with longitudinally nonuniform quasi-phase-matching gratings: pulse compression and shaping*, Optical Society of America, vol. 17, No. 2, Feb. 2000, pp. 304-318.

Imeshev, et al., *Ultrashort-pulse second-harmonic generation with longitudinally nonuniform quasi-phase-matching gratings: pulse compression and shaping*, Optical Society of America, 2001, ERRATA.

Stuart D. Jackson, *Cross relaxation and energy transfer upconversion processes relevant to the functioning of 2 μm $Tm^{3+}$-doped silica fibre lasers*, Optics Communications 230 (2004), pp. 197-203.

Kane, et al., *3-Watt blue source based on 914-nm $Nd:YVO_4$ passively-Q-switched laser amplified in cladding-pumped Nd:fiber*, ASSP 2004, paper MD7.

Kasamatsu, et al., *1.49-μm Band Gain-Shifted Thulium-Doped Fiber Amplifier for WDM Transmission Systems*, Journal of Lightwave Technology, vol. 20, No. 10, Oct. 2002, pp. 1826-1837.

Klein, et al, *Rapid infrared wavelength access with a picosecond PPLN OPO synchronously pumped by a mode-locked diode laser*, Appl. Phys. B 73, 2001, pp. 1-10.

Myers, et al., *Quasi-phase-matched optical parametric oscillators in bulk periodically poled $LiNbO_3$*, J. Opt. Soc. Am. B, vol. 12, No. 11, Nov. 1995, pp. 2102-2116.

Nelson, et al., *Broadly tunable sub-500 fs pulses from an additive-pulse mode-locked thulium-doped fiber ring laser*, Appl. Phy. Lett. 67, vol. 67, 1995, pp. 19-21.

Ouzounov, et al., *Generation of Megawatt Optical Solitons in Hollow-Core Photonic Band-Gap Fibers*, Science 301, 1702, 2003, pp. 1702-1704.

Powers, et al., *Continuous tuning of a continuous-wave periodically poled lithium niobate optical parametric oscillator by use of a fan-out grating design*, Optics Letters, vol. 23, No. 3, Feb. 1, 1998, pp. 159-161.

Schober, et al., *Tunable-chirp pulse compression in quasi-phase-matched second-harmonic generation*, Optics Letters, vol. 27, No. 13, Jul. 1, 2002, pp. 1129-1131.

Soh, et al., *A Cladding Pumped Neodymium-doped Fiber Laser Tunable From 932 nm to 953 nm*, ASSP 2004, paper MD9.

Vodopyanov, et al., *Optical parametric oscillation in quasi-phase-matched GaAs*, Optics Letters, vol. 29, No. 16, Aug. 15, 2004, pp. 1912-1914.

Dubietis, et al, "Powerful femtosecond pulse generation by chirped and stretched pulse parametric amplification in BBO crystal", Optics Communications, vol. 88, No. 4,5,6, Apr. 1, 1992, pp. 437-440.

G. Arisholm et al., "Limits to the power scalability of high-gain optical parametric amplifiers", J. Opt. Soc. Am. B, vol. 21, No. 3, pp. 578-590, Mar. 2004.

R.A. Baumgartner et al., "Optical Parametric Amplification", IEEE J. Quant. Elec, vol. QE-15, No. 6, pp. 432-444, Jun. 1979.

G.P. Banfi et al., "Travelling-wave parametric conversion of microjoule pulses with LBO", Optics Communications, vol. 118, pp. 353-359, Jul. 1995.

Byer et al., "Optical Parametric Oscillation and Amplification" Feature Issue Editors- Byer/ Piskarskas, J. Opt. Soc. Am. B, vol. 10, No. 11, pp. 2148-2148, Nov. 1993.

G. Cerullo et al., "Sub-8-fs pulses from an ultrabroadband optical parametric amplifier in the visible", Optics Letters, vol. 23, No. 16, pp. 1283-1285, Aug. 1998.

G. Cerullo et al., "Ultrafast optical parametric amplifiers", Review of Scientific Instruments, vol. 74, No. 1, pp. 1-18, Jan. 2003.

R.C. Eckardt et al., "Optical parametric oscillator frequency tuning and control: errata"; J. Opt. Soc. Am. B, vol. 12, No. 11, p. 2322, Nov. 1995.

R.C. Eckardt et al., "Optical parametric oscillator frequency tuning and control", J. Opt. Soc. Am. B, vol. 8, No. 3, pp. 646-667, Mar. 1991.

A.Galvanauskas et al., "Fiber-laser-based femtosecond parametric generator in bulk periodically poled LiNbO3", Optics Letters, vol. 22, No. 2, pp. 105-107, Jan. 1997.

A.Galvanauskas et al., "High-energy femtosecond pulse amlification in a quasi-phase-matched parametric amplifier", Optics Letters, vol. 23, No. 3, pp. 210-212, Feb. 1998.

E. Innerhofer et al. "Analysis of nonlinear wavelength conversion system for a red-green-blue laser-projection source", J. Opt. Soc. Am. B, vol. 23, No. 2, pp. 265-275, Feb. 2006.

B. Kohler et al. "A 9.5-W 82-MHz-repetition-rate picosecond optical parametric generator with cw diode laser injection seeding", Applied Physics B, vol. 75, pp. 31-34, published online in Aug. 2002.

S.V. Marchese et al. "Room temperature femtosecond optical parametric generation in MgO-doped stoichiometric LiTaO3", Applied Physics B: Lasers and Optics vol. 81, pp. 1049-1052, published online Nov. 2005.

L. E. Myers et al. "Quasi-phase-matched optical parametric oscillators in bulk periodically poled LiNbO3", J. Opt. Soc. Am. B, vol. 12, No. 11, pp. 2102-2116, Nov. 1995.

A. Piskarskas et al. "Optical parametric generators: tunable, powerful, ultrafast:", Opt. Photonics News, pp. 25-28 and 55, Jul. 1997.

M. Reed et al. "Microjoule-energy ultrafast optical parametric amplifiers", J. Opt. Soc. Am. B vol. 12, No. 11, pp. 2229-2236, Nov. 1995.

"Optical Parametric Generators (OPG)" Encyclopedia of Laser Physics and Technology, available on the website http://www.rp-photonics.com/optical_parametric_amplifiers.html at least until Jan. 19, 2009.

"Optical Parametric Amplifiers (OPA)", Encyclopedia of Laser Physics and Technology, available on the website http://www.rp-photonics.com/optical_parametric_amplifiers.html at least until Jan. 21, 2009.

C. Schriever et. al., "Tunable pulses from below 300 to 970 nm with durations down to 14 fs based on a 2 MHz ytterbium-doped fiber system", Optics Letters, vol. 33, No. 2, pp. 192-194, Jan. 2008.

A. Shirakawa et al. "Sub-5-fs visible pulse generation by pulse-front-matched noncollinear optical parametric amplification", Applied Physics Letters, vol. 74, No. 16, pp. 2268-2270, Apr. 1999.

T Sudmeyer et al. "Novel ultrafast parametric systems: high repetition rate single-pass OPG and fibre-feedback OPO", J. Phys D: Appl. Phys., vol. 34, pp. 2433-2439, Aug. 2001.

K. Finsterbusch, et al., "Tunable, high-power, narrow-band picosecond IR radiation by optical parametric amplification in KTP", Applied Physics B 74, pp. 319-322, Mar. 13, 2002.

Baltuska et al. 'Controlling the Carrier-Envelope Phase of Ultrashort Light Pulses with Optical Parametric Amplifiers', Physical Review Letters, vol. 88, No. 13, pp. 133901-1 to 133901-4, Apr. 1, 2002.

Erny et al., 'Mid-infrared difference-frequency generation of ultrashort pulses tunable between 3.2 and 4.8 μm', Opt. Lett., vol. 32, No. 9, pp. 1138-1140, May 1, 2007.

Lacovara et al. 'Room temperature diode pumped Yb:YAG laser', Opt. Lett., 16, pp. 1089-1091, Jul. 15, 1991.

Marangoni et al., 'Near-infrared optical parametric amplifier at 1 MHz directly pumped by a femtosecond oscillator', Opt. Lett., vol. 32. pp. 1489-1491, Jun. 1, 2007.

Wilhelm et al., 'Sub-20-fs pulses tunable across the visible from a blue pumped single-pass noncolinear parametric converter', Opt. Lett., vol. 22, No. 19, pp. 1494—1496, Oct. 1, 1997.

Yang et al., 'Multiterawatt laser system based on optical parametric chirped pulse amplification', Opt. Lett., vol. 27, pp. 1135-1137, Jul. 1, 2002.

* cited by examiner

OPTICAL PARAMETRIC AMPLIFICATION, OPTICAL PARAMETRIC GENERATION, AND OPTICAL PUMPING IN OPTICAL FIBERS SYSTEMS

CROSS-REFERENCES TO RELATED APPLICATIONS

This application claims priority under 35 U.S.C. 119(e) to U.S. Provisional Patent Application No. 60/556,101 filed Mar. 25, 2004 and entitled "Ultrabroadband Sources Based on Fiber Laser Pumped Optical Parametric Generation and Amplification in Periodically-Poled Materials" and to U.S. Provisional Patent Application No. 60/624,140 filed Nov. 1, 2004 and entitled "A Source of Short Optical Pulses Based on Amplification in Tm-Doped Fiber", each of which are hereby incorporated herein by reference in their entirety.

BACKGROUND

Certain embodiments of the invention relate to apparatus and methods for, converting optical pulses from compact fiber laser pulse sources into pulses having different wavelengths and having a large or increased bandwidth through the use of optical parametric amplifying media. Other embodiments of the invention relate to apparatus and methods for producing short optical pulses utilizing amplification in optical fibers operating in the infrared region beyond about 1700 nm.

Nonlinear optical elements may be employed to provide amplification in a process know as optical parametric amplification (OPA). In such a process, an intense coherent pump beam at a first wavelength interacts with the nonlinear optical element such as a nonlinear optical crystal to produce amplification. One or two output beams at respective second and third optical wavelengths exit the nonlinear optical element. These output beams are referred to as the signal and the idler. In optical parametric amplification, in addition to being pumped, the nonlinear optical element is seeded with radiation at the signal and possibly idler wavelengths.

The optical parametric amplification process obeys the conservation of energy principle $\omega_1=\omega_2+\omega_3$, where $\omega_1$ is the pump frequency and $\omega_2$ and $\omega_3$ are the signal and idler frequencies. The individual values of $\omega_2$ and $\omega_3$ also satisfy the conservation of momentum condition, which for plane wave intersection is $k_1=k_2+k_3$ where $k_1$, $k_2$, and $k_3$ are the respective wavenumbers for $\omega_1$, $\omega_2$, and $\omega_3$. This later condition provides for phase-matching. Phase matching can be varied by changing an appropriate phase matching parameter of the nonlinear optical element such as the angle of propagation or the temperature.

If is no light is supplied to the nonlinear optical element at $\omega_2$ or $\omega_3$, the process is referred to as optical parametric generation (OPG). In OPG, seeding is provided by noise.

When $\omega_2=\omega_3$, the process is termed degenerate.

Parametric amplification can be incorporated in a resonant cavity that circulates the signal and/or the idler. In this geometry, the process is termed parametric oscillation. A parametric amplifier inside a resonant optical cavity yields a laser that can be used to generate a frequency-tunable coherent beam of light by pumping with a beam of fixed frequency. This laser is tuned by varying the phase matching properties of the nonlinear optical element.

Unique apparatus and methods of implementing optical parametric amplification and optical parametric generation are presented below.

SUMMARY

One embodiment of the invention comprises a pulsed light source based on optical parametric generation. This pulse light source comprises a pump laser and a nonlinear crystal. The pump laser is configured to output optical pulses having a pulse width of about 10 nanoseconds or less. The nonlinear crystal is selected from the group comprising periodically poled lithium-niobate, periodically poled KTP, periodically-twinned quartz, periodically poled RTA, periodically poled lithium tantalate, and periodically poled potassium niobate. The optical pulses from the pump laser pump the nonlinear crystal thereby producing optical parametric generation having a bandwidth of at least about 200 nanometers.

Another embodiment also comprises a pulsed light source based on optical parametric generation. This pulsed light source comprises a pump fiber laser and a nonlinear crystal selected from the group comprising periodically poled lithium-niobate, periodically poled KTP, periodically-poled quartz, periodically poled RTA, periodically poled lithium tantalate, periodically poled potassium niobate and orientation patterned GaAs. The pump fiber laser is configured to provide pump energy to the nonlinear crystal so as to produce spectral emission via optical parametric generation in a spectral range exceeding a width of about 100 nanometers (nm).

Another embodiment of the invention comprises a pulsed light source based on optical parametric amplification. This pulses light source comprises a fiber pump laser, a fiber continuum source, and a nonlinear crystal. The nonlinear crystal receives optical pulses from the fiber pump laser and optical pulses from the fiber continuum source. The optical pulses from the fiber continuum source are amplified by optical parametric amplification in the nonlinear crystal. The optical pulses from the fiber pump laser and the optical pulses from the fiber continuum source are substantially synchronized in time.

Another embodiment of the invention also comprises a pulsed light source based on optical parametric amplification. This pulses light source comprises a pump laser, a seed source, and a nonlinear crystal. The seed source comprises an optical continuum fiber. The nonlinear crystal receives optical pulses from the pump laser and optical pulses from the seed source. The optical pulses from the seed source are amplified by optical parametric amplification in the nonlinear crystal. The optical pulses from the pump laser and the optical pulses from the seed source are substantially synchronized in time.

Another embodiment of the invention also comprises a pulsed light source based on optical parametric amplification. The pulsed light source comprises a pump laser source, a seed source, and a nonlinear crystal. The nonlinear crystal receives optical pulses from the pump laser source and optical pulses from the seed source and produces spectral emission as a result of optical parametric amplification. This spectral emission has a spectral range exceeding a width of about 100 nm.

Another embodiment of the invention comprises an optical pulse source comprising a seed laser, a pulse stretcher, a Tm-doped fiber amplifier, and an output port. The seed laser is configured to emit optical seed pulses. The pulse stretcher is configured to stretch the seed pulses. The Tm-doped fiber amplifier is configured to amplify the stretched optical pulses. The output port outputs optical pulses amplified by the Tm-doped fiber amplifier. The optical pulses output from the output port have a pulse width of about 1 nanosecond or less and have a spectral content in a wavelength range extending from about 1600 to about 2400 nanometers.

Another embodiment of the invention comprises an optical pulse source comprising a Tm-doped fiber source, one or more nonlinear crystals, and an output port. The Tm-doped fiber source is configured to produce optical pulses. The one or more nonlinear crystals are disposed to receive the optical pulses. These one or more nonlinear crystals are configured for frequency up-conversion or down-conversion of the optical pulses. The output port outputs the optical pulses. These optical pulses output from the output port have a pulse width of about 1 nanosecond or less.

Another embodiment of the invention comprises an optical pulse source comprising means for producing optical seed pulses, means for stretching the seed pulses, means for amplifying the stretched optical pulses, and means for outputting the optical amplified pulses. The means for amplifying the stretched optical pulses comprises a Tm-doped fiber amplifier. The optical pulses output from the output port have a pulse width of about 1 nanosecond (ns) or less and have a spectral content in a wavelength range extending from about 1600 to about 2400 nanometers.

Another embodiment of the invention comprises an optical pulse source comprising means for producing optical pulses, means for frequency up-converting or frequency down-converting of the optical pulses, and means for outputting the optical pulses. The means for producing optical pulses comprises a Tm-doped fiber. The optical pulses output from the output port have a pulse width of about 1 nanosecond or less.

Another embodiment of the invention comprises a method of producing optical pulses comprising producing optical seed pulses, stretching the seed pulses, amplifying said stretched optical pulses, and outputting the amplified optical pulses. The stretched optical pulses are amplified using a Tm-doped fiber amplifier. The optical pulses output from the output port have a pulse width of about 1 nanosecond or less and have a spectral content in a wavelength range extending from about 1600 to about 2400 nanometers.

Another embodiment of the invention comprises a method of producing optical pulses comprising producing optical pulses, frequency up-converting or frequency down-converting of the optical pulses, and outputting the optical pulses. The optical pulses are produced using a Tm-doped fiber. The optical pulses output from the output port have a pulse width of about 1 nanosecond or less.

DETAILED DESCRIPTION OF PREFERRED EMBODIMENTS

Figure 1:
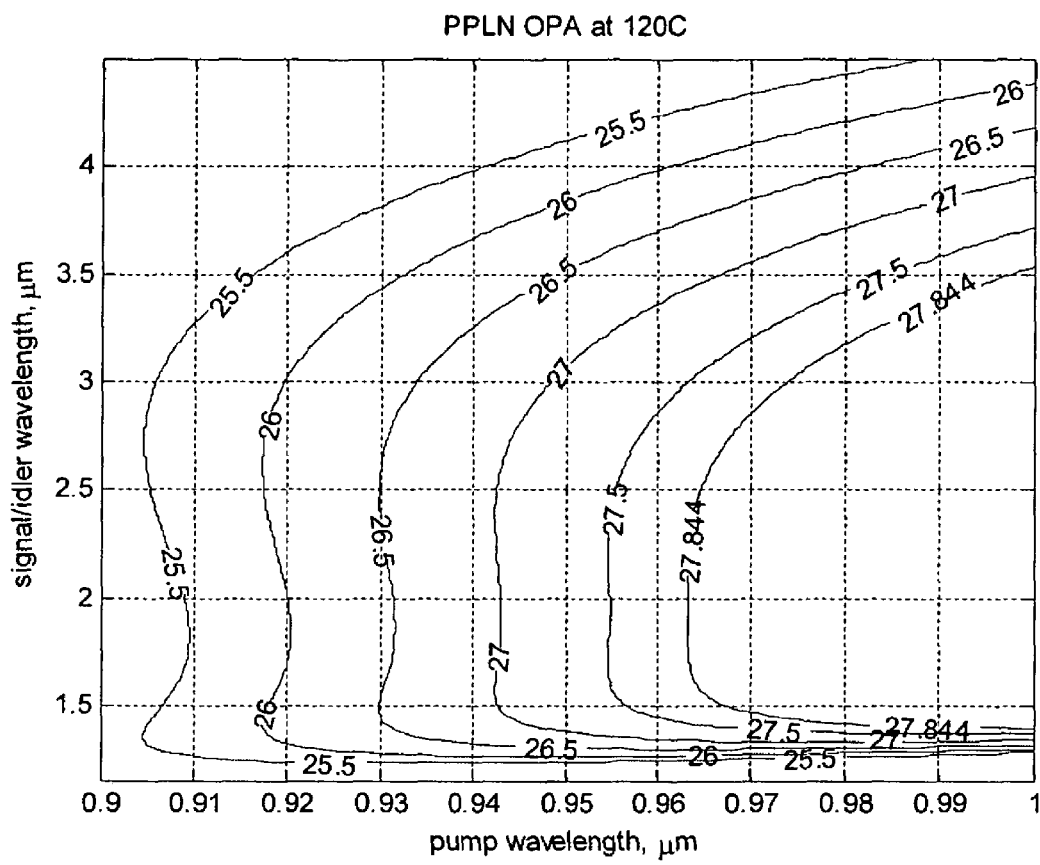
FIG. 1 shows signal wavelengths greater than about 1 micron output from a periodically-poled lithium niobate (PPLN) optical parametric amplifier (OPA) pumped with pump wavelength between about 0.9 and 1.0 microns ($\mu m$) for a variety of quasi-phase matched (QPM) periods.

These and other embodiments of the present invention will also become readily apparent to those skilled in the art from the following detailed description of the preferred embodiments having reference to the attached figures, the invention not being limited to any particular embodiment(s) disclosed. Accordingly, the scope of the present invention is intended to be defined only by reference to the claims.

Various embodiments of the invention comprise optical parametric amplification (OPA) systems that output broad bandwidth, short optical pulses. Many of these systems operate at infrared wavelengths, between, e.g., about 1.9 to 2.1 microns or higher or lower. These optical parametric amplification systems are pumped by fiber amplifiers that produce broad bandwidth short pump pulses. In certain embodiments, for example, a moderate pulse energy (about 50 nJ or more) fiber laser system is used as a pump for an OPA system. This OPA system may comprise a periodically-poled material having periodic poling that provides quasi-phase matching (QPM). The effect of intrinsic dispersive properties of optical components in the OPA system such as optical fiber, which would otherwise produce pulse broadening, can be reduced by selection of appropriate combinations of pump wavelengths and the quasi-phase matching periods. Small-signal parametric gain bandwidths exceeding about 1000 nm can thereby be achieved. For example, pumping an OPA system comprising a periodically-poled lithium niobate (PPLN) that is pumped with wavelengths in the range of about 900-970 nm and selecting QPM periods appropriately allows for small-signal parametric gain bandwidths for the lithium niobate OPA exceeding about 1500-2000 nm centered at about 1.9 um.

Optical Parametric Amplification

An OPA system may be operated close to the degeneracy point where the signal frequency is approximately equal to the idler frequency. This degeneracy condition can be established by appropriate phase matching. As described above, phase matching may be controlled by selecting a modulation period (in the case of quasi-phase matching) of the OPA material or selecting the angle and temperature (in the case of birefringent phase-matching). Selecting such parameters to establish the signal wavelength at about twice the pump wavelength results in large OPA bandwidths for amplification of the signal wave.

Tuning behavior of an OPA is often expressed as a dependence of the signal of signal wavelength, $\lambda_s$, on the pump wavelength, $\lambda_p$, $$\lambda_s = \lambda_s(\lambda_p)$$

under the condition that the OPA process is phase-matched (birefringently or through QPM). At the degeneracy point, the first derivative vanishes ($\partial\lambda_p/\partial\lambda_s = 0$). Accordingly, the OPA bandwidth is determined by the second derivative, $\partial^2\lambda_p/\partial\lambda_s^2$.

Operating at the degeneracy point may lead to OPA gain bandwidths, for example, in the range of about 50-300 nm, depending on the material, device length and operating wavelengths. For instance, for OPA in 10-mm-long periodically-poled lithium niobate (PPLN) with QPM period of 18.9 μm, the small signal gain at about 1550 nm has a bandwidth of about 44 nm when pumped at $\lambda_p = 780$ nm.

As described above, phase-matching of OPA with QPM materials is governed by the energy and the momentum conservation equations, $$1/\lambda_p = 1/\lambda_s + 1/\lambda_i \quad (1)$$

$$1/\Lambda = n_p/\lambda_p - n_s/\lambda_s - n_i/\lambda_i, \quad (2)$$

where $\lambda_k$ is the wavelength, $n_k$ is the refractive index, $\Lambda$ is the QPM period (subscript k corresponds to either p, s, i, which denotes pump, signal, and idler, respectively). For a given material and temperature (i.e. for a given material dispersion) these equations have four independent variables. For example, if QPM period is chosen, the tuning curve $\lambda_s = \lambda_s(\lambda_p)$ is uniquely defined. As another example, establishing the degeneracy point as described above wherein $\lambda_s = \lambda_i = 2\lambda_p$, uniquely defines the QPM period for each pump wavelength.

To find a regime for ultra broadband OPA gain, two conditions can be established in addition to those set forth in Eqs. (1) and (2):

$$\partial\lambda_p/\partial\lambda_s = 0 \text{ (satisfied at the degeneracy point, and}$$

$$\partial^2\lambda_p/\partial\lambda_s^2 = 0$$

This set of these conditions uniquely identifies the QPM period and the interacting wavelengths. The result of such calculation is shown in FIG. 1, where contour lines represent tuning behaviors for different QPM periods (labeled in microns). In particular, FIG. 1 shows signal wavelengths greater than about 1 micron output from a periodically-poled lithium niobate (PPLN) optical parametric amplifier (OPA) pumped with a pump wavelength between about 0.9 and 1.0 microns for a variety of quasi-phase matched (QPM) periods. As can be seen, for example, for $\lambda_p = 963.2$ nm and QPM period of 27.844 μm, the tuning behavior is extremely flat for different signal wavelengths around the degeneracy point. If the pump wavelength is chosen to be shorter than about 963.2 nm and the QPM period is adjusted appropriately, an even wider bandwidth is possible.

Figure 2:
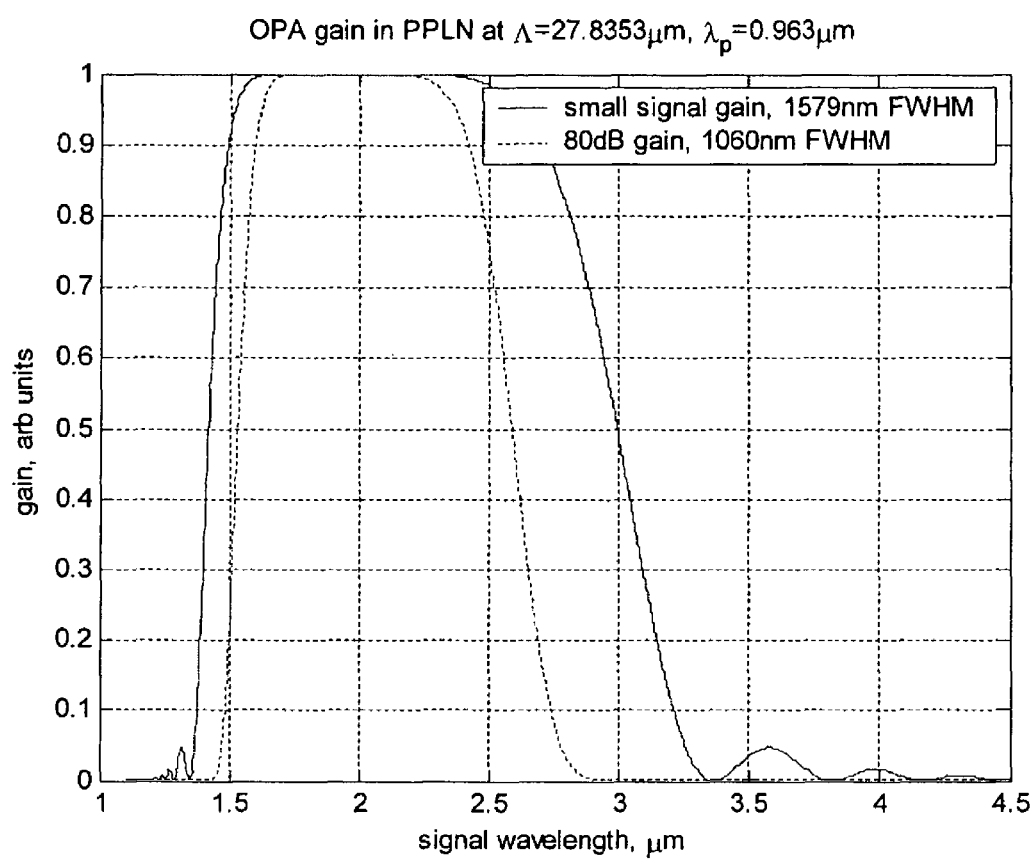
FIG. 2 shows the gain provided by a periodically-poled lithium niobate optical parametric amplifier (PPLN OPA) for signal wavelengths between about 1 and 3.5 microns a for pump wavelength of about 963 nm and quasi-phase matched period of about 27.83 micrometer ($\mu m$).
Figure 3:
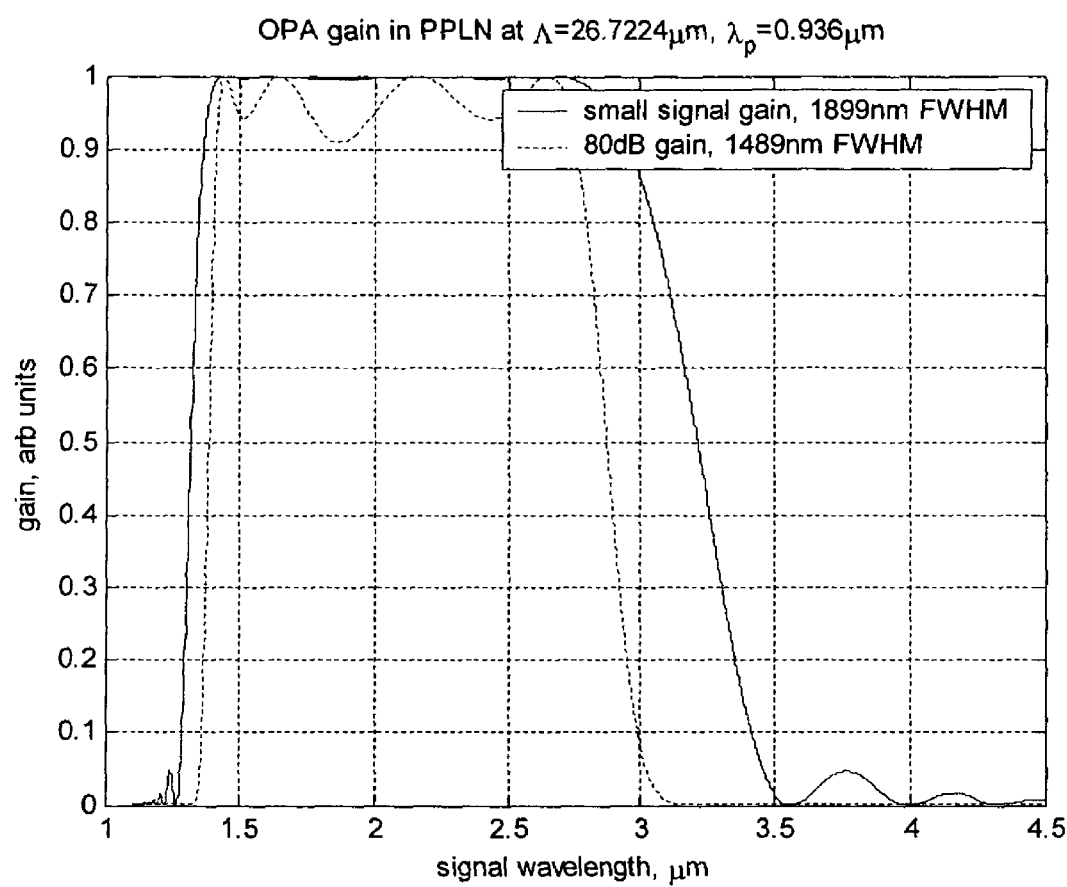
FIG. 3 shows the gain provided by a PPLN OPA for signal wavelengths between about 1 and 3.5 microns for a pump wavelength of about 936 nm and quasi-phase matched period of about 26.72 $\mu m$.

Additionally, in FIG. 2 and FIG. 3, the calculated OPA gain spectrum is plotted for a PPLN device of 1 millimeter (mm) length. In FIG. 2, the small-signal gain bandwidth is in excess of 1500 nm or 110 terahertz (THz) at the degeneracy point and the OPG bandwidth is in excess of 1000 nm or 80 THz. Slightly away from degeneracy, at $\lambda_p = 936$ nm and the QPM period of 26.74 μm, the small-signal gain bandwidth is about 1900 nm or 135 THz and the OPG gain bandwidth is about 1500 nm or 110 THz.

As described in further detail below, parametric amplification can be used in a manner to provide several important advantages. Unlike quantum amplifiers that operate at specific wavelength bands defined by electron transitions in the gain material, QPM parametric amplifiers, which do not rely on such processes, and can have a gain peak (and gain bandwidth) engineered to be at the desired wavelength within the material's transparency window. See for example U.S. Pat. No. 6,181,463, entitled "Quasi-phase-matched Parametric Chirped Pulse Amplification Systems," issued to Galvanauskas et al., which is incorporated herein by reference in its entirety. Accordingly, limitations on the gain bandwidth and pump wavelength, inherent in quantum amplifiers, can be removed by using quasi-phase-matched nonlinear materials. Moreover, as also discussed below, operating OPA in the regimes where special dispersion conditions exist results in ultra broadband gains approaching and exceeding an octave.

Additionally, parametric amplification systems are inherently simpler and more compact. Parametric amplification in a single stage can provide up to about 80 dB gain (the limit is imposed by the threshold for optical parametric generation (OPG)). Therefore, starting from about 10 pJ as a minimum energy obtainable with any fiber, laser diode or solid state oscillator, high pulse energies in the 1 mJ to 1 J range can be reached using only one or two amplification stages. Consequently, regenerative schemes and multi-pass schemes are not necessary.

In various preferred embodiments, the parametric gain as well as the maximum energy conversion from the pump into the signal in a parametric amplifier are sufficiently high (e.g., approximately 10 to 50%) to be useful. This energy conversion is determined by the peak intensity of the pump and the properties of the nonlinear crystal. Birefringent phase-matched crystals entail high peak intensities, which are substantially higher than those practically achievable with a pump pulse from a compact, diode-pumped source. As described below, however, using QPM materials such as PPLN, lower-intensity pumps for OPA can be used to achieve appreciable parametric gains. Further discussion of PPLN and related materials and their properties is provided in U.S.

Pat. No. 5,815,307 entitled "Aperiodic Quasi-phasematching Gratings for Chirp Adjustments and Frequency Conversion of Ultra-short Pulses" issued to Arbore et al., U.S. Pat. No. 5,862,287 issued to Stock et al., U.S. Pat. No. 5,880,877 entitled "Apparatus and Methods for the Generation of High Power Femtosecond Pulses from a Fiber Amplifiers," issued to Fermann et al., and Myers et al., "Quasi-phase-matched optical parametric oscillators in bulk periodically poled lithium niobate", J. Opt. Soc. Am. B 22, 2102 (1995), which are each hereby incorporated herein by reference in their entirety.

Accordingly, practical advantages of various of the ultra broadband amplification schemes described herein are essentially determined by the advantageous properties of the nonlinear material used for OPA. Because a QPM parametric medium allows a reduction of required pump energies, a variety of system configurations producing amplified ultra broadband pulses becomes available for implementation. A variety of different system architectures are discussed below.

Figure 4:
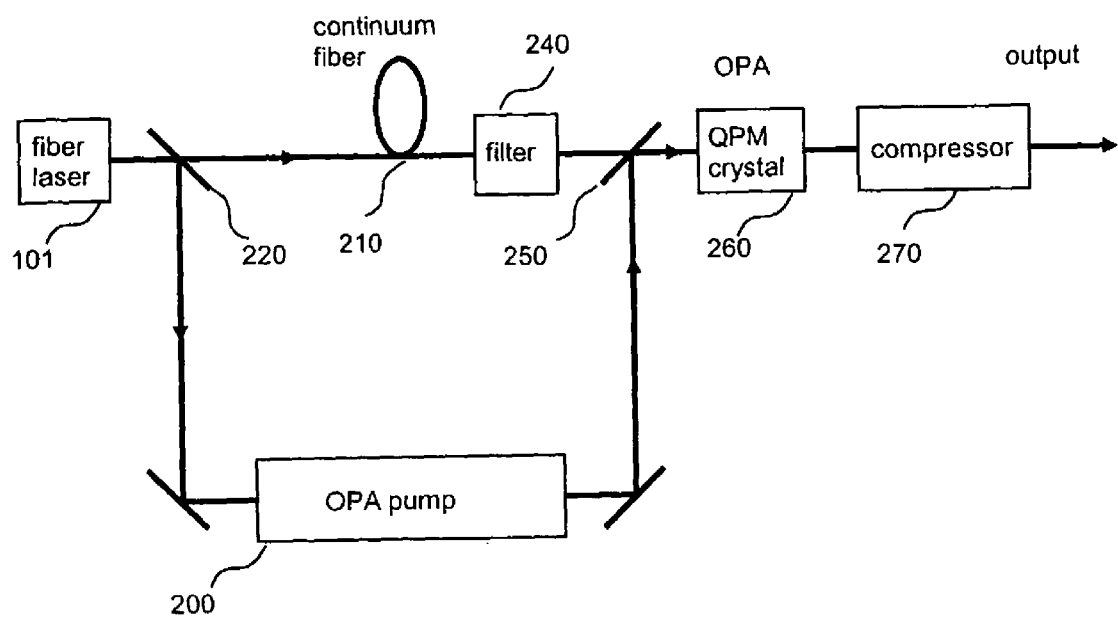
FIG. 4 is an illustration of a compact fiber based source comprising a quasi-phase matched optical parametric amplifier that outputs amplified ultra broadband pulses.

FIG. 4, for example, illustrates an amplification system comprising a short-pulse fiber laser 101 whose output is split into two arms by a beam splitter 220. In a one arm is an OPA pump 200 that provides pump power. The OPA pump 200 outputs high-energy, narrow-bandwidth, pump pulses. The OPA pump 200 is described in greater detail below.

In another arm, a broadband continuum is generated in a continuum fiber 210. This continuum fiber 210 may comprise, for example, a fiber having nonlinear properties. Output from the continuum fiber 210 is passed through a filter 240 to filter out twice the center wavelength of the light generated by an OPA pump 200 located in a second arm. The filter 240 may pass long- and/or short-wavelength parts relative to twice the center wavelength of the OPA pump 200. This broadband continuum output comprises a seed pulse for seeding the OPA process.

Accordingly, the output from the continuum fiber 210 after being filtered by the filter 240 as well as the pump output from the OPA pump 200 are combined by a beamsplitter/coupler 250 and applied to the parametric amplifier 260. The beam splitter 250 thus combines high-energy narrow-bandwidth pump pulses from the OPA pump 200 and wide-bandwidth seed pulses from the continuum fiber 210. An amplified signal is produced by the parametric amplifier 260. This amplified signal is applied to the pulse compressor 270.

The various components may be coupled together by optical fiber or other types of waveguides. Free space propagation and bulk components may also be used.

The fiber laser 101 may be a mode-locked oscillator or a mode-locked oscillator followed by a one or more fiber amplifiers. The fiber laser 101 is constructed to deliver pulse energies and peak powers sufficient to produce a wide enough continuum in the continuum fiber 210, e.g., a few nanojoules (nJ). For additional background, see, U.S. Patent Publication 2004/0,213,302 entitled "Pulsed Laser Sources" filed by Fermann et al, which is incorporated herein by reference in its entirety. In various embodiments, the fiber laser 101 is an Er fiber laser that produces short optical pulses at about 1560 nm with the repetition rate of 20-100 megahertz (MHz). The laser 101 may produce linearly-polarized light as for example can be obtained by using polarization-maintaining (PM) components. The laser is optionally implemented as a master-oscillator-power-amplifier (MOPA) configuration. Such lasers are described in U.S. Patent Application No. 60/519,447, which is incorporated herein by reference in its entirety and are available from IMRA America, Ann Arbor Mich.

The output of the laser 101 is split into the two arms with a non-wavelength-selective beam splitter 220. The splitter 220 may have a 50/50 splitting ratio, however, other splitting ratios can also be used. The splitter 220 may comprise a fused fiber coupler. Optionally, a bulk splitter can be used, either in a fiber-coupled arrangement or by incorporating separate bulk optics to couple light in and out of the fibers.

The ultra broadband continuum in one arm is generated in the continuum fiber 210, which may comprise a micro-structured fiber or a conventional solid-core high-nonlinearity fiber. Optionally, two or more different nonlinear fiber types can be used sequentially as discussed in U.S. Patent Publication 2004/0,213,302 A1, which is incorporated herein by reference in its entirety. With such an approach, continuum generation can be optimized for different spectral parts, thereby resulting in stable operation over a wide ultra broadband spectrum.

Alternatively, the output from the splitter 220 can be split into two or more arms and different nonlinear fibers or sequences of nonlinear fibers in different arms can be used to optimize the continuum output for each individual arm. The optimization of the continuum output in each arm is particularly useful when creating ultra broadband continua or ultra-flat continua as well as low noise continua. Flat continua are preferred in most applications to reduce or avoid the occurrence of 'spectral holes'. For example, in optical coherence tomography, spectral holes limit the optical resolution. Equally, in spectroscopy, spectral holes limit the signal/noise of a potential detection system in certain parts of the spectrum, which is undesired.

Spectral continua can be tailored for variety of operation modes. For example flat continua may be obtained by using an ultra-short input pulse (about 60 fs or less) or by concatenation of nonlinear fibers of different design as discussed above. See also U.S. Patent Publication 2004/0,213,302 A1 and T. Hori et al., "Flatly broadened, wideband and low noise supercontinuum generation in highly nonlinear hybrid fiber", Optics Express 12, No. 2, p. 317, 2004, each of which are incorporated herein by reference in their entirety.

As described above, low noise spectral continua may be generated by reducing or minimizing the width of the pulses injected into the nonlinear continuum fiber(s) 210. Additionally, in certain embodiments, fibers with a dispersion $\geqq 0$ $fs^2/m$ at least in the vicinity of the spectrum of the input pulses are used instead of the negative dispersion (soliton-supporting) highly nonlinear fibers. A negative dispersion value is referred to herein as soliton supporting, whereas positive dispersion is referred to as not soliton supporting. Accordingly, the fiber may have a slightly positive dispersion at least in a spectral range, e.g., of about 5 THz within the center of input pulse spectrum. For example, at a wavelength of about 1560 nm, a highly nonlinear fiber may have a dispersion $\geqq 0$ $fs^2/m$ in a spectral range from about 1540-1580 nm. Even outside this spectral range, the highly nonlinear fiber may be dispersion flattened and the dispersion does not drop to below about $-100,000$ $fs^2/m$ or not below about $-50,000$ $fs^2/m$ in the whole spectral region of interest.

Even in the presence of highly nonlinear fibers with negative dispersion, low noise spectral continua can be obtained by using the anti-Stokes part of the spectral continuum. The anti-Stokes part of the spectral continuum is generated mainly by coherent nonlinear processes such as self-phase modulation as well as self-steepening. In contrast, incoherent and inherently noisy nonlinear processes such as Raman scattering play only a minor role in the anti-Stokes part of the spectral continuum. Thus, the noise from Raman scattering can be substantially reduced by only using the anti-Stokes part of the continuum. The anti-Stokes part of the continuum is referred to as the spectral range with an optical frequency lower than the center frequency of the input pulses.

With continued reference to FIG. 4, the filter 240 following the continuum fiber 210 reduces or avoids problems associated with the phase-sensitive OPA 260 by blocking light at and possibly above or below twice the wavelength of the OPA pump 200. The filter 240 may be implemented as a fiberoptic component, which has the advantage of compactness and ruggedness. Alternatively, bulk short- or long-pass dielectric filters can be used for this purpose, either in a fiber-coupled arrangement or incorporating separate bulk optics to couple light in and out of the fibers. Other configurations are also possible. Optionally, the filter 240 is followed by polarization control elements such as, e.g., bulk waveplates or their fiberoptic counterparts to provide a suitable polarization state for pumping the OPA 260. Optionally, if the spectral output of the continuum fiber 210 lies completely on one side relative to twice the wavelength of the OPA pump 200, the filter 240 may be omitted without causing problems associated with phase-sensitive OPA.

The OPA pump 200 is disposed in the other arm of the splitter 220 to generate and provide the OPA pump beam. (As will be discussed below, the configuration comprising the fiber laser 101 and OPA pump 200 can be useful for applications other than pumping the OPA 260.) For increased gain to be achieved in the OPA 260, the pulse lengths of the pulse output from the continuum arm and the pulse output from the OPA pump arm can be matched to each other. The pulse length of the OPA pump arm output, for example, may be adjusted to be equal to (or somewhat exceed) the pulse length of the seed pulse output from the continuum arm.

The configuration shown in FIG. 4 has the benefit of a single source 101 being used both for generation of the OPA seed continuum and for seeding the OPA pump 200. Such a configuration does not require any special arrangement to eliminate temporal jitter between the pump 200 and the OPA seed source 210. Other embodiments following this general approach of using a single source for the continuum and the OPA pump are possible.

As described above and shown in FIG. 4, the output from the OPA pump 200 and the output of the continuum filter 240 are combined at the beam splitter 250 and further are focused into the bulk OPA 260. The beam splitter 250 can be implemented with a fused fiber wavelength-division-multiplexing (WDM) coupler. Alternatively, bulk short- or long-pass dielectric filters can be used for this purpose, either in a fiber-coupled arrangement or incorporating separate bulk optics to couple light in and out of the fibers. Other configurations and designs are possible.

The parametric amplifier 260 is preferably implemented with periodically-poled lithium niobate (PPLN) that has the quasi-phase matched (QPM) period and the operating temperature chosen appropriately to achieve ultra broadband OPA. Preferably, a Type I phase-matching configuration is used so that the interacting waves are polarized as extraordinary waves and interact with the largest element of the nonlinear susceptibility tensor. Alternatively, other polarization combinations can be used in a Type II configuration thereby utilizing different non-zero components of the nonlinear susceptibility tensor and different dispersion relations.

Alternatively, other QPM crystals can be used with appropriate polarizations, temperature and wavelengths choices. Examples of other QPM crystals include periodically-poled potassium titanyl phosphate (KTP), periodically-twinned quartz, periodically-poled rubidium titanyl arsenate (RTA), periodically-poled lithium tantalate, periodically-poled potassium niobate. Such nonlinear crystals can be configured to enable quasi-phase matched frequency conversion, optical parametric generation, amplification etc., as described herein.

Alternatively, instead of the bulk QPM crystal, an optical waveguide formed in a QPM material can be used for OPA; see for example U.S. Pat. No. 6,181,463 issued to Galvanauskas, et al. Using a nonlinear optical waveguide for OPA allows for substantial increase in the efficiency compared to bulk materials. The dispersive properties of such optical waveguide are generally noticeably different from that of the substrate bulk material and depend on the waveguide parameters. Hence to achieve the ultra broadband OPA regime, the selection of pump and signal wavelengths, temperature and QPM period is generally different from that for the substrate bulk material. The nonlinear waveguide guides both the pump wave and the ultra broadband continuum being amplified. In various preferred embodiments, each of the interacting waves stays predominantly in one mode in an interaction region in the nonlinear waveguide. Optionally, the waveguide OPA device can be pigtailed to allow for direct splicing with the rest of the fiber-based components which may comprise the entire system.

In various embodiments, the compressor 270 has enough bandwidth to support the bandwidth of the amplified pulses output from the OPA 260. The compressor 270 may be constructed using bulk diffraction gratings, fiber Bragg gratings, volume Bragg gratings, as described in U.S. Pat. No. 5,499,134 entitled "Optical Pulse Amplification Using Chirped Bragg Grating," issued to Galvanauskas et al, which is also incorporated herein by reference in its entirety or photonic band-gap fiber, as described in Fermann et al., "All-fiber Chirped Pulse Amplification Systems" U.S. Patent Application No. 60/539,110, entitled "All-fiber Chirped Pulse Amplification Systems," filed by Fermmann et al, which is also incorporated herein by reference in its entirety. Optionally, because the OPA is generally not peak power limited, the compressor 270 can be placed anywhere before the OPA 260 and after the continuum fiber 210. Optionally, if ultra broadband amplified pulses need not be compressed for a particular application, the compressor 270 can be omitted altogether.

A wide range of configurations and designs are possible, in certain embodiments, for example, the fiber laser 101 may comprise an Er-doped fiber laser that outputs optical pulses at about 1.55 μm wavelength. These pulses may have a bandwidth of between about 2 and 40 nm and may be between about 30 and 500 femtoseconds (fs) in duration. The OPA pump 200 may comprise a frequency-doubled Tm-doped fiber amplifier that outputs optical pulses having the wavelength of between about 935 and 950 nm. These pulses may have a bandwidth of between about 1 and 30 nm and may be about 30 fs and 1000 picoseconds (ps) in duration. The continuum fiber 210 may output optical pulses in the range of about 1.1 to 2.5 μm. The pulses may have a bandwidth of between about 40 and 2000 nm and a pulse length between about 30 fs and 1000 ps duration. The optical filter 240 may filter out light at about 1900 nm. The optical pulses will remain between about 30 fs and 1000 ps in temporal duration. This filter may additionally remove light above or below 1900 nm. The QPM crystal 260 may output pulses having a similar spectrum as output by the optical filter 240, however, amplified in intensity. These pulses output by the QPM crystal 260 may be between about 30 fs and 1000 ps in duration. The compressor 270 compresses these pulses to between about 3 fs and 300 fs in length. Likewise, the outputs of the fiber laser 101, the OPA pump 200, and the QPM crystal 260 may be at least substantially or nearly bandwidth limited. Compressed optical pulses may be obtained wherein the pulse compression is about 10 times or less than the bandwidth limit, about 3 times or less than the bandwidth limit, or about 2 times than the bandwidth limit. As discussed more fully below, selection of appropriate dispersion of the respective components may be employed to provide such near bandwidth limited operation. Values outside these ranges are also possible and in some embodiments the pulses are not bandwidth limited.

Other designs of the optical parametric amplification system are possible. The components may operate at different wavelengths and the dispersion and other parameters may produce optical pulses having different temporal duration. Similarly, the bandwidth of the optical pulses may be different. In addition, components may be added, excluded, or arranged differently in other designs.

OPA Pump

Figure 5:
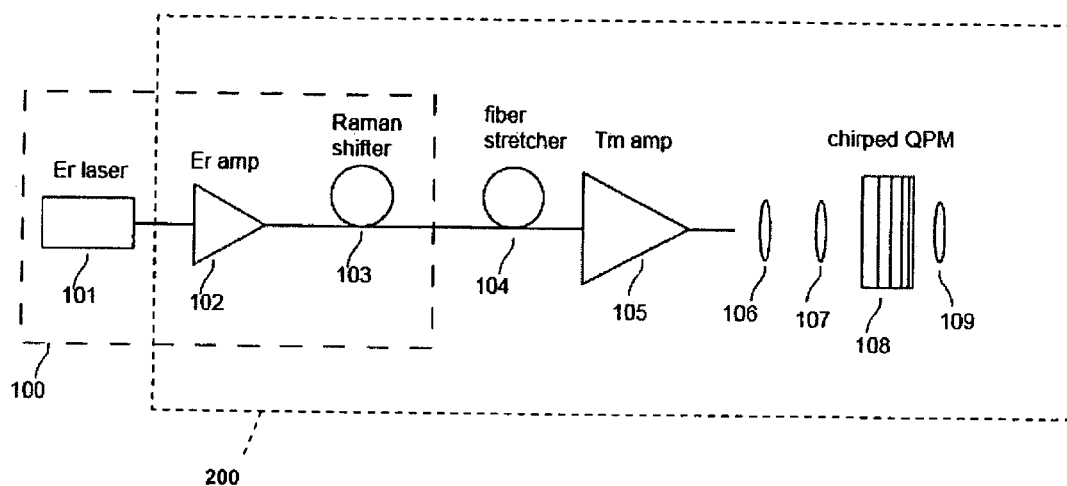
FIG. 5 is an illustration of a compact, tunable, fiber based source comprising a Tm fiber amplifier that generates high peak and high average power ultrashort pulses in the wavelength range of about 900-1050 nm.

As discussed above, the OPA pump 200 shown in FIG. 4 can be used for applications other than pumping optical parametric amplification (OPA). FIG. 5 represents an exemplary embodiment of a short pulse tunable fiber laser system for pumping ultra broadband OPA (see OPA pump element 200 in FIG. 4) and for other applications as well.

The description above with reference to the short pulse source 101 shown in FIG. 4 is directly applicable to the laser source 101 shown in FIG. 5. This short pulse source 101 may comprise, for example, an Er-doped fiber laser or other type of pulsed source. The Er fiber 101 can be cladding pumped through the side of the fiber (see, e.g., L. Goldberg et al., Optics Letters, 24, 673 (1999) which is incorporated herein by reference in its entirety), or though other arrangements of cladding pumping can be employed. Alternatively, the Er fiber could be directly pumped into the core with a high-power pump laser (not shown). Other arrangements are possible.

In the case of an Er-doped fiber laser 101, the laser outputs optical pulses at about 1.55 microns. These optical pulses may have a bandwidth between about 2 and 40 nm and maybe substantially bandwidth limited. Accordingly, the optical pulses may have a pulse duration of between about 30 and 500 femtoseconds in some embodiments. Values outside these ranges are also possible.

This short pulse source 101 produces optical pulses that seed an Er-doped fiber amplifier 102 and accordingly may be referred to as a short seed pulse source. The output of the laser 101 is directed to the Er-doped fiber amplifier 102 through an optical isolator (not shown separately). The Er-doped fiber amplifier 102 may operate in the nonlinear regime, i.e. with the B-integral exceeding unity, enabling higher-order soliton compression. Examples of such amplifiers are described in U.S. Pat. No. 6,014,249 entitled "Apparatus and Method for the Generation of High-power Femtosecond Pulses from a Fiber Amplifier," issued to Fermann et al, which is incorporated herein by reference in its entirety. Accordingly, the optical pulses output from the Er-doped fiber amplifier may be substantially bandwidth limited and may have a duration of between about 30 and 500 fs in some embodiments. In some embodiments, values outside these ranges can also be used. The amplifier 102 may be implemented with polarization maintaining (PM) components. Optionally, the pulses output from the Er-doped fiber amplifier 102 have a spectral part that has its optical frequency slightly Raman shifted (about 10-50 nm) compared to the output of the fiber oscillator 101. Other types of optical amplifiers may also be used.

The output of the fiber amplifier 102 is injected into a Raman-shifting fiber 103. Optical coupling may be completed by fusion splicing of the respective fibers. At the end of such Raman fiber, the central frequency of the Raman soliton is substantially shifted to the longer wavelength; see, e.g., U.S. patent application Ser. No. 09/576,772, entitled "Modular, High Energy, Widely Tunable Ultrafast Fiber Source," filed May 23, 2000 by Fermann et al, which is incorporated herein by reference in its entirety. The output wavelength can be tuned by changing the pulse energy input to the Raman shifting fiber, which in turn can be adjusted by changing the gain of the amplifier 102. Wavelength-tunable pulses can be obtained in the range of about 1600-2200 nm and beyond. In certain embodiments, the Raman shifter is implemented with a polarization maintaining (PM) fiber. The Raman soliton pulses may have a bandwidth of about 20 to 50 nm and the pulses are nearly-transform-limited with pulse lengths of 30 to 200 femtosecond (fs).

Elements 101, 102, and 103 form a seeder block 100 that produces nearly bandwidth limited tunable pulses in the wavelength range of about 1600-2200 nm. See also U.S. patent application Ser. No. 09/576,772, the contents of which are incorporated herein by reference.

The output of the Raman shifting fiber 103 at about 2 μm wavelength is injected to a fiber stretcher 104. In certain embodiments, this fiber stretcher 104 provides normal dispersion and has a length that produces chirped pulses with pulse length of about 6 picoseconds (ps) or shorter. Coupling may be made by fusion splicing of the fibers. To provide normal dispersion, a small core (large NA) fiber may be used for stretching. Other embodiments are also possible. Alternatively, the fiber stretcher 104 provides anomalous dispersion.

Alternatively, instead of the fiber stretcher 104, a chirped fiber Bragg grating (FBG) can be used for pulse stretching. Suitable arrangements can be used to couple light in and out of the FBG. The FBG has a low group delay ripple and may have a linear chirp. Optionally, a nonlinearly-chirped FBG can be used as described in U.S. application Ser. No. 09/576,772, and U.S. patent application Ser. No. 10/608,233 entitled "In-line, High Energy Fiber Chirped Pulse Amplification System," filed by Fermann et al, both of which are incorporated herein by reference in their entirety.

The output of fiber stretcher 104 is injected into the fundamental mode of a fiber amplifier 105 comprising a thulium-doped (Tm-doped) fiber. Accordingly, optical pulses having wavelengths between about 1.55 and 2.1 microns are coupled from the fiber stretcher 104 into the Tm-doped fiber amplifier 105 which outputs similar wavelengths. Optical coupling can be performed by fusion splicing, a fiber coupler, or a bulk-optic imaging system. Other methods of optically coupling the fiber stretcher 104 and the fiber amplifier 105 may also be used. The amplifier fiber 105 may be a large-mode-area (LMA) fiber. To obtain a diffraction limited output, the fundamental mode in the LMA may be selectively excited and guided (see, e.g., U.S. Pat. No. 5,818,630 entitled "Single-mode Amplifier and Compressors Based on Multi-mode Fibers," issued to M. E. Fermann et al. which is incorporated herein by reference in its entirety). The use of LMA fiber allows for high peak powers to be obtained at the output of the amplifier 105.

The Tm amplifier fiber may also comprise polarization maintaining fiber. In case of non-polarization maintaining fibers, appropriate polarization control elements like waveplates may be used prior to the fiber amplifier 105 or after the amplifier to prepare a polarization state appropriate for optimum frequency-doubling using a nonlinear crystal 108 (discussed more fully below). An LMA microstructured (holey) can also be used.

Also different dopants may be employed in different embodiments. For example, a holmium doped (Ho-doped) fiber amplifier can alternatively be used. The fiber can also be co-doped with other rare earths to enhance pump absorption as well. Still other designs are possible.

Tm-doped fibers (and in particular Tm-doped LMA fibers), however, have a number of advantages. The nonlinear parameter of Tm fiber is 2-4 times smaller, for example, than that of Er/Yb and Yb fibers, allowing for higher peak powers to be achieved. The reason for this is twofold. First, $1/\lambda$ scaling of the nonlinearity provides for reduced nonlinearity. Second, the mode area is larger in Tm than in Er/Yb and Yb for the same core size.

Thulium is also advantageous because the gain bandwidth of Tm fiber is about 100-300 nm and broader allowing to support sub-100 fs pulse amplification and/or tunable pulses. Tm-doped fiber has a high dispersion that may be about $-20$ to $-100$ $ps^2/km$ (anomalous). Such dispersion is about 2-4 times larger than that of typical Er/Yb fibers.

The quantum defect of Tm fiber pumped at about 790 nm and operating at about 2 μm is about 60%, much higher than that of Yb and Er fibers operating at about 1.1 μm and 1.5 μm, respectively, and pumped at 980 nm. However, utilizing cross-relaxation and energy transfer processes in heavily-doped Tm fibers, quantum efficiencies exceeding 100% may be achieved. See, for example, S. Jackson, Opt. Comm. 230 (2004) pp. 197-203. Hence, Tm doped silica fiber amplifiers can be efficient, with the efficiency performance approaching that of Yb and Er doped fibers.

In certain embodiments, the amplifier 105 is end-pumped with the output from a laser diode bar (not shown). Other configurations are possible. For example, similar pumping arrangements as described above for the Er fiber laser 101 can be also used for pumping Tm-doped fiber as well.

In certain embodiments, the Tm-doped fiber amplifier 105 is pumped at about 790 nm. Other pumping wavelengths, e.g., at about 1.1 μm and 1.5 μm, can be used. Dual-wavelength pumping schemes (see, e.g., Gomes et al, Optics Letters, vol. 28, 2003, pp. 334-336, which is incorporated herein by reference in its entirety) involving two optical pumps at two different wavelengths can also be used to pump the Tm-doped fiber amplifier 105. The Tm fiber amplifier can also be co-doped with Yb in order to allow pumping at wavelength between 900-1050 nm.

In the embodiment shown in FIG. 5, the Tm-doped fiber amplifier 105 comprises about 2.5 meters (m) of 25 μm core Tm-doped fiber. This Tm-doped fiber is end-pumped with about 25 watts (W) (coupled) power from the output of a fiber-coupled laser diode bar (not shown) at about 790 nm. The pump absorption is about 6.6 dB/m. When seeded with about 10-30 milliwatts (mW) average power from the stretcher fiber 104, the Tm-amplifier 105 produces about 1-1.5 W amplified power. This amplifier 105 supports peak powers of about 50-100 kilowatts (kW), several times higher than, for example, Er/Yb fiber arranged in comparable geometry. If a larger or smaller core Tm-doped fiber amplifier 105 is used, the pulse energy and peak power numbers recited herein can be scaled appropriately.

At repetition rates of about 50-200 MHz, the pulses input to the amplifier 105 are stretched up to a few picoseconds to stay below the peak power limit to produce compressible amplified pulses. In various preferred embodiments, for example, the pulses output by the stretcher and input into the amplifier are between about 1 and 10 picoseconds in durations. The length of the stretcher fiber 104 is chosen to provide adequate dispersion for stretching the pulses input to the amplifier 105. The dispersion of the Tm-fiber (between about $-80\times10^{-3}$ $ps^2$ and $-300\times10^{-3}$ $ps^2$) is also to be factored into the overall system dispersion design to produce nearly bandwidth limited pulses at the output of the system. The elements affecting the system dispersion as described here are the stretcher fiber 104, coupling and mode-conversion optics, optional isolator (s), Tm fiber and any other transmission fiber as part of elements 104 and 105.

Fiber lasers and amplifiers are susceptible to optical feedback, so appropriate isolators (not shown) can be inserted between the oscillator and the fiber amplifier as well as between the amplifiers if more than one amplifier is used. In the embodiment shown in FIG. 5, the Tm amplifier 105 is seeded with the output of the Raman-shifted Er-doped fiber oscillator 101. Consequently, the lasing and the amplified wavelengths are substantially different. With this arrangement, the oscillator has the advantage of being much less susceptible to optical feedback from the amplifier so that an isolator can be omitted.

Another advantage of seeding the Tm amplifier 105 with the Raman-shifted Er oscillator 101 is that the Raman shifted pulses are "clean." For example, these pulses have a smooth spectral profile, without ripple. Such clean pulses can be amplified to higher energies before nonlinear effects in the amplifier 105 substantially deteriorate the amplified pulse quality (e.g., through self-phase-modulation).

The output of the Tm amplifier 105 is coupled to the chirped QPM frequency doubler 108 with the lens arrangement represented in FIG. 5 by lenses 106 and 107. The generated doubled and compressed pulses are collimated with lens 109. The lenses 106, 107, and 109 have focal lengths and positions that yield suitable beam sizes in the doubling crystal and in free space. Optionally, instead of two lenses 106 and 107, a one lens arrangement can be used. Other configurations are also possible.

The chirped quasi-phase matched (QPM) frequency doubler 108 combines the functions of pulse compression and frequency doubling; (see, e.g., U.S. Pat. No. 5,867,304 entitled "Use of Aperiodic Quasi-phase-matched Gratings in Ultrashort Pulse Sources" issued to Galvanauskas et al. as well as U.S. Pat. No. 6,198,568 entitled "Use of Chirped Quasi-phase-matched Materials in Chirped Pulse Amplification," issued to Galvanauskas et al., both of which are incorporated herein by reference.) The chirped QPM frequency doubler 108 shown in FIG. 5 operates in transmission and provides for a uniquely compact system. The chirped QPM frequency doubler 108 can be used to compress either positively or negatively chirped pulses. The dispersion of the chirped QPM doubler can be tailored to include higher-order terms as well. The chirped QPM frequency doubler 108 provides group delay from 1 to 10 ps at about 2 μm. For example, the group velocity mismatch parameter in lithium niobate for doubling of 1900 nm pulses is about 0.17 ps/mm, so that a 5-cm long device can be used to compress 8.5 ps stretched pulses close to the bandwidth limit.

In certain preferred embodiments, the chirp of the QPM frequency doubler 108 is such that the frequency doubler produces nearly bandwidth limited frequency doubled pulses. The bandwidth of the pulses may be, for example, between about 5 to 30 nm. In some embodiments, the chirp compensates any chirp accumulated prior to the frequency doubling stage. This accumulate chirp may include chirp due to fiber dispersion as well as due to self-phase-modulation (SPM) in the fiber amplifier(s). Accordingly, with smooth pulses as described here, the higher-order chirp due to SPM can be compensated as well with the appropriate nonlinearly-chirped QPM frequency doubler 108 to produce transform-limited or nearly transform-limited frequency-doubled pulses. If the pulse length generated in the continuum fiber 210, e.g., in FIG. 4 is longer than the bandwidth limit of the frequency doubled pulses, the chirp of the QPM frequency doubler 108 can adjusted to produce frequency doubled pulses that are as long as the continuum pulses or slightly longer.

In various exemplary embodiment, the optical pulses at the output of the laser 101 may have a bandwidth between about 2 and 40 nm and a pulse duration of between about 30 and 500 femtoseconds in some embodiments. The optical pulses output from the Er-doped fiber amplifier 102 may be substantially bandwidth limited and may have a duration of between about 30 and 500 fs in some embodiments. The optical pulses output from the Raman shifter 103 may have a bandwidth of about 20-50 nm and the pulses are nearly-transform-limited with pulse lengths of 30 to 400 femtosecond (fs). The optical pulses output from the fiber stretcher 104 have a bandwidth of about 10-50 nm and the pulses are substantially stretched to pulse lengths of 1 to 15 picosecond. The optical pulses output from the Tm amplifier 105 have a bandwidth of about 10-50 nm and the pulses are substantially stretched to pulse lengths of 1 to 10 picosecond. The optical pulses output from the chirped QPM frequency doubler 108 have a bandwidth of about 5-50 nm and the pulses are nearly-transform-limited with pulse lengths of 30 to 200 femtosecond (fs). In some embodiments, the pulse may be compressed to less than or equal to 10 times the bandwidth limit, 3 times the bandwidth limit or 2 times the bandwidth limit. Values outside these ranges are also possible.

The chirped QPM doubler 108 may comprise a lithium niobate substrate. Optionally, other QPM materials can be used.

The small signal conversion efficiency in chirped PPLN assuming confocal focusing is about $100\%/nJ \times \tau_c/\tau_s$, where $\tau_c$ and $\tau_s$ are the compressed and stretched pulse lengths, respectively (see, e.g., Imeshev et al., JOSA B, vol. 17, 2000, pp. 304-318). Assuming (conservatively) about 25 kW peak power of the amplified pulses, a stretched pulse length of about 8.5 ps, and a compressed pulse length of about 100 fs, the pulse energy output from the amplifier 105 is about 200 nJ. Accordingly, the small-signal doubling efficiency of chirped PPLN is about 1%/nJ which means that the conversion would be overdriven with about 200 nJ input pulses if confocal focusing is used. Overdriving the nonlinear conversion leads to back conversion limitations on the efficiency (see, e.g., Eimerl, IEEE JQE vol. 23, 1987, pp. 1361-1371, which is incorporate herein by reference in its entirety) and ultimately pulse quality deteriorations. Hence to achieve high quality frequency doubled pulses with overall conversion efficiency in the range about 25-50% and more, somewhat looser than confocal focusing may be used. With this approach, frequency converted pulses with pulse energies of about 50-100 nJ and average powers of about 250-1000 mW are generated.

Optionally, frequency-selective filter(s) can be used at the output of the system to separate frequency-doubled pulses from the remaining unconverted pulses. Particularly, if the embodiment shown in FIG. 5 is used for the OPA pump 200, e.g., as part of the embodiment shown in FIG. 4, such filter placing may be use to avoid seeding the OPA 260 in FIG. 4 with the unconverted fundamental.

The overall system tunability is achieved by changing the gain of the Er amplifier 102 and hence the pulse energy input to the Raman shifter 103. The phase-mating condition of the doubling crystal 108 is also appropriately adjusted. The latter can be done with temperature, angle-tuning and/or transverse translation of the QPM crystal 108. Discrete tuning with multi-grating QPM crystals is also possible. Continuous tuning with uniform-period PPLN gratings can be achieved with a fan-out grating arrangement; see, e.g., U.S. Pat. No. 6,359,914 entitled "Tunable Pulsed Narrow Bandwidth Light Source," issued to Powers et al, which is incorporated by reference in its entirety. Continuously-tunable chirp is also possible; see, e.g., A. M. Schober, G. Imeshev, M. M. Fejer, "Tunable-chirp pulse compression in quasi-phase-matched second-harmonic generation" Optics Letters, Vol. 27, Issue 13, Page 1129, July 2002, which is also incorporated herein by reference in its entirety. In some embodiments, a suitably designed fan-out structure can be used to provide continuous period tuning of a chirped QPM grating. Alternatively, an appropriately designed fan-out structure can be used to provide continuous tuning of both period and chirp of a chirped QPM grating.

Alternatively, if the pulses are not stretched to the maximum practical group delay limit of the chirped QPM doubler 108 (for example, to about 8.5 ps for a chirped PPLN about 5 cm long, as discussed above), the tunability can be built into the chirped QPM doubler. For example, the chirped QPM doubler 108 can provide the necessary chirp for pulse compression but have the acceptance bandwidth exceeding that of the pulses. For example, if the stretched pulse length is about 3 ps and the pulse bandwidth is about 30 nm, the chirp that the QPM doubler 108 needs to supply is about 0.1 ps/nm and the corresponding crystal length is about 1.8 cm. Fabricating the QPM doubler 108 with the same chirp of 0.1 ps/nm, however, with a length of about 5 cm will provide the acceptance bandwidth of about 83 nm.

Figure 6:
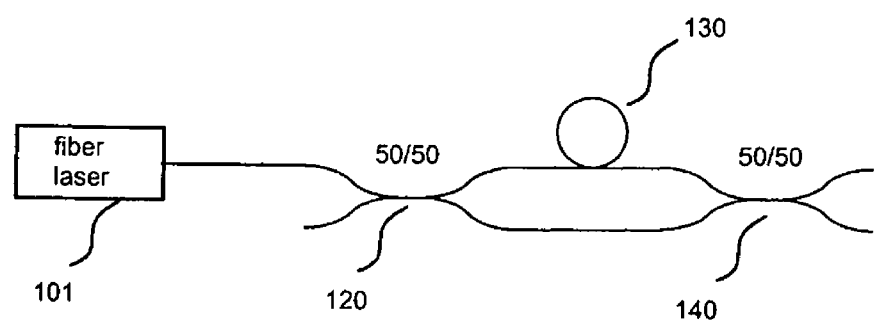
FIG. 6 is an illustration of an arrangement for scaling up the repetition rate of the seed pulses.

For some applications like two-photon microscopy, it is advantageous to have the laser system that can operate at high average powers (greater than about 500-1000 mW), with high repetition rates (greater than about 100-300 MHz), but with moderate pulse energies of few nanojoules (greater than about 2 nJ) to avoid damage to the sample. Obtaining such repetition rates from an environmentally stable and robust Er-doped fiber oscillator 101 can be difficult. To scale up the repetition rate from an environmentally stable Er-doped fiber oscillator 101 and provide average power, a time-division-multiplexing approach, as illustrated in FIG. 6, can be employed. In one embodiment, the output of laser 101 is evenly power split between the two arms of the 50/50 coupler 120. In one arm of the coupler 120, an extra length of transmission fiber 130 is inserted. This segment of transmission fiber 130 has a length such that the group delay difference between the two arms is approximately half of the separation between consecutive pulses in the pulse stream output by the laser 101 and coupled into the coupler 120. The outputs of the two arms are combined with the second 50/50 coupler 140 to produce a pulse stream with a repetition rate twice that from laser 101. For example, for a 100 MHz seed laser, the fiber length difference between the two arms may be approximately 10.4 meters to produce a stream of evenly spaced pulses at 200 MHz. Such repetition rate multiplication arrangement comprising elements 120, 130, and 140 has a minimum insertion loss of 3 dB, which can be compensated for with the amplifier(s) downstream. This arrangement can be inserted, for example, after the oscillator 101, after the amplifier 102, or after the Raman shifter 103 in FIG. 5.

Such an arrangement can be cascaded to multiply the repetition rate by 4×, 8×, etc. With such cascaded arrangements, the insertion loss is also about 3 dB or slightly more because of the insertion loss of the components used and non-ideal splices. Alternatively, instead of the 50/50 splitters, 1×N splitters can be used to multiply the repetition rate by N. Such fused fiber coupler components are readily available. In certain embodiments, integrated optical waveguide couplers can be formed on planar substrates or other platforms that support lightwave circuits.

Figure 7:
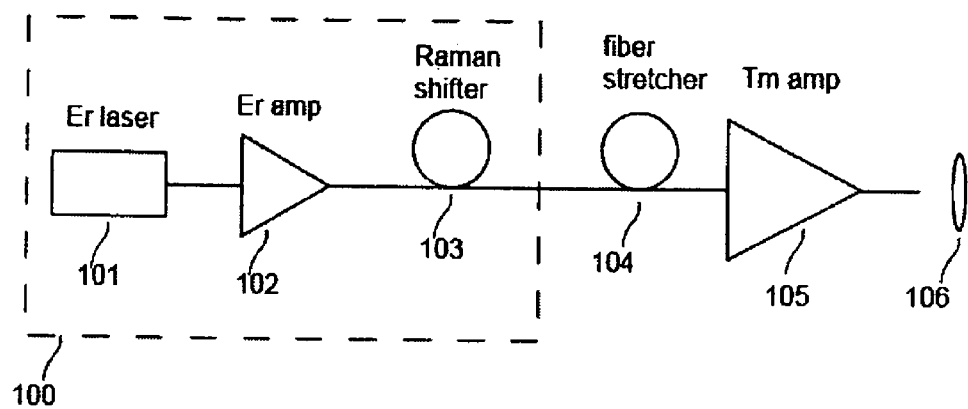
FIG. 7 is an illustration of a compact, tunable, fiber based source comprising a Tm fiber amplifier that generates high peak and high average power compressed pulses in the wavelength range of about 1800-2100 nm.

For applications requiring compressed pulses with pulse energies of few nano-Joules at a wavelength of about 2 μm, a particularly compact system can be constructed as shown in FIG. 7. As in FIG. 5, the seeder block 100 comprises a Raman-shifted amplified Er-doped fiber laser 101, 102, 103. The output of the seeder block 100 and, in particular the output of the Raman shifter 103, is directed into a fiber stretcher 104. The output of the fiber stretcher 104 is optically coupled into the Tm-doped fiber amplifier 105. A lens 106 is used to couple light out of the Tm-doped fiber amplifier 105. In certain embodiments, the Er-doped fiber laser 101, the Er-doped fiber amplifier 102, the Raman shifter 103, the fiber stretcher 104, and the Tm-doped fiber amplifier 105 each comprise optical fiber and may be optically coupled together, for example, through fusion splicing. Description of elements 100, 101, 102, 103, 105 and 106 provided above with reference to FIG. 5 are applicable to the embodiment illustrated in FIG. 7.

In one embodiment, the Tm-doped amplifier fiber 105 has a substantial dispersion of about $-85$ $ps^2$/km, so that approximately 2.5 meters of this fiber introduces a substantial group delay of about 2-3 ps across the bandwidth output from the Raman shifter 103. If the length of the fiber stretcher 104 is selected appropriately to provide dispersion approximately opposite to, the dispersion of the Tm fiber amplifier, the ~100 fs pulses injected to the fiber stretcher will be negatively stretched to about 2-3 ps after the fiber stretcher 104 and then amplified and simultaneously compressed close to about 100 fs in the Tm-doped fiber amplifier 105. To provide normal dispersion, a small core (large NA) fiber may be used as a fiber stretcher 104. Alternatively, a linearly- or nonlinearly-chirped FBG can be used in place of the fiber stretcher 104 as described above. Other designs are possible. The dispersion of the Tm-doped amplifier fiber 105 may, for example, range between about $-80\times10^{-3}$ $ps^2$ and $-300\times10^{-3}$ $ps^2$ in other embodiments. In certain embodiments, the dispersion of the stretcher is substantially equal (within about 90%) and opposite to the dispersion of the Tm-doped amplifiers so as to reduce the net dispersion and produce substantially bandwidth limited optical pulses. Accordingly, the dispersion of the stretcher may be between about $-80\times10^{-3}$ $ps^2$ and $-300\times 10^{-3}$ $ps^2$ in certain embodiments. As described above, in some embodiments, the pulse may be compressed to less than or equal to 10 times the bandwidth limit, 3 times the bandwidth limit or 2 times the bandwidth limit. Values outside these ranges are also possible.

The arrangement shown in FIG. 7 utilizes dispersive pulse compression inside the Tm amplifier fiber 105 to achieve higher peak powers from the amplifier compared to the amplification of strongly chirped pulses (i.e. pulses chirped to lengths substantially exceeding 3 ps). Because the nonlinear phase shift is proportional to the peak power of the propagating pulses, the dominant contribution to the nonlinear phase shift comes from the end of the amplified fiber, where the pulses are the shortest. This effect yields an effective amplifier length for nonlinear effects that is shorter than that for amplification of strongly chirped pulses.

Figure 9:
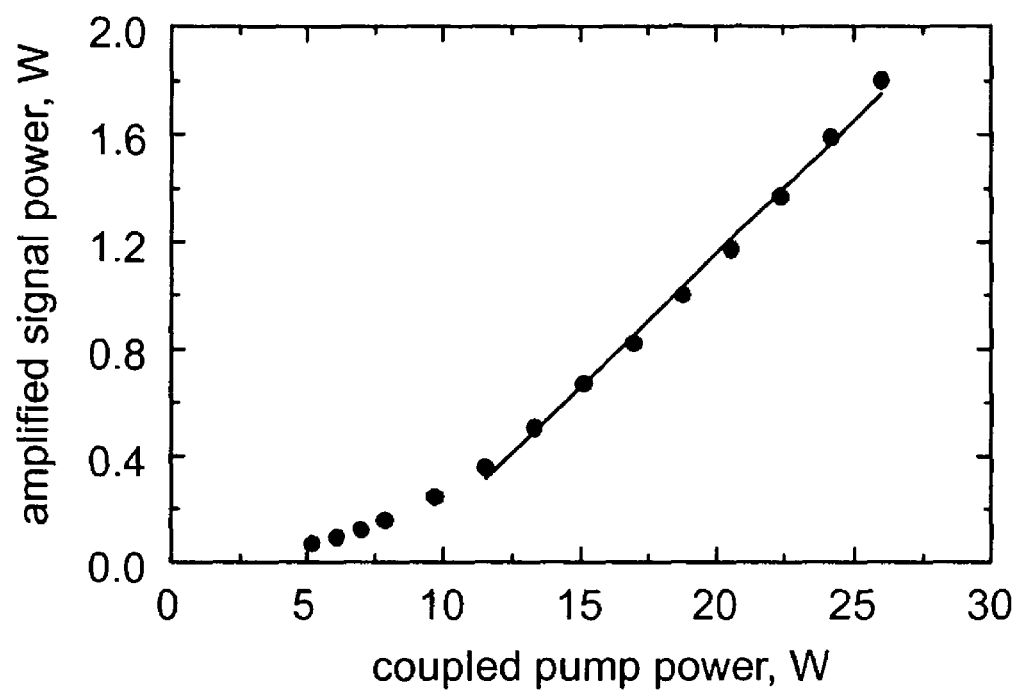
FIG. 9 illustrates the amplified signal power output at 1994 nm as a function of the coupled pump power at about 790 nm, as obtained with the embodiment illustrated in FIG. 7.
Figure 10:
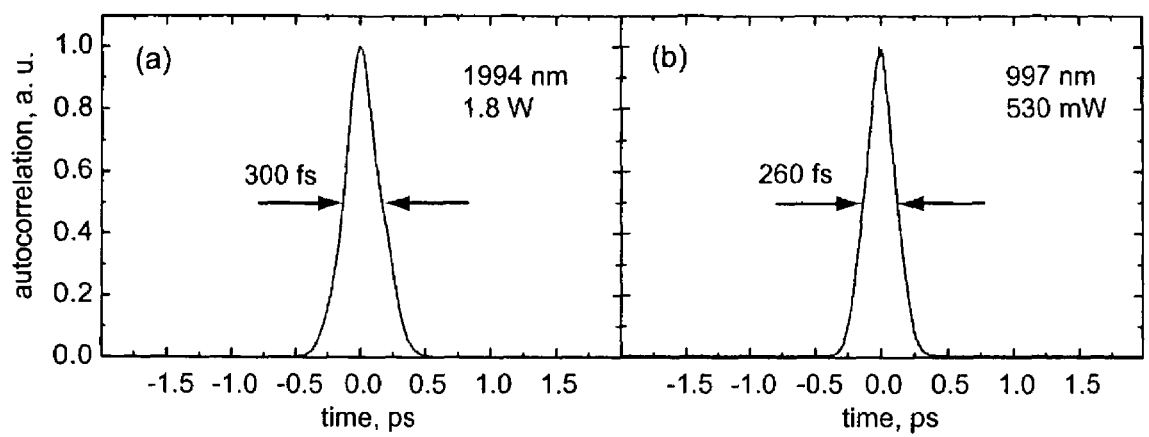
FIG. 10 illustrates the autocorrelations measured at 1994 nm and 997 nm, as obtained with the embodiment illustrated in FIG. 8.

In an exemplary embodiment, the fiber stretcher 104 comprises a length of silica fiber of about 140 cm with a numerical aperture (NA) of about 0.35 providing anomalous dispersion at about 1994 nm so that the pulses output from the fiber stretcher 104 have a pulse length of about 2.5 ps. The Tm amplifier 105 comprises a Tm-doped fiber having a length of about 2.5 meters and a core diameter of about 25 μm. The Tm amplifier 105 is end-pumped with up to about 26 W (coupled) power from the output of a fiber-coupled diode bar at about 790 nm. When seeded with between about 10-30 mW average power at about 1994 nm from the fiber stretcher 104, the amplifier 105 produces up to about 1.8 W average power at about 100 MHz repetition rate (about 18 nJ pulse energy), as shown in FIG. 9. The amplifier has a slope efficiency of about 10%. From the autocorrelation width of about 300 fs in the example shown in FIG. 10(a), a pulse length is determined to be about 190 fs, assuming a deconvolution factor of about 1.6 as would be appropriate for a bandwidth-limited pulse. Thus, the peak power in the Tm amplifier 105 is estimated to be about 95 kW. Other embodiments may have different specifications and performance.

Hence the system shown in FIG. 7 is capable of producing compressed tunable pulses at a wavelength of about 2 μm with a pulse length of 100-200 fs, pulse energies exceeding 5-10 nJ, and average powers exceeding 1 W at 50-100 MHz repetition rates. Values outside these ranges are possible. For example, the average power and the repetition rate can be increased further using the arrangement shown in FIG. 6 as described above. Such a source is useful for a variety of applications including gas sensing and nonlinear frequency conversion (preferably with QPM nonlinear materials) including harmonic generation, optical parametric generation and amplification using nonlinear crystals such as periodically poled $LiNbO_3$ (PPLN), periodically poled lithium tantalate, KTP and KTP isomorphs, as well as orientation patterned GaAs (OPGaAs); see e.g., 'Optical parametric oscillation in quasi-phase-matched GaAs', Vodopyanov et al., Opt. Lett., vol. 29, pp. 1912-1914 (2004), which is incorporated herein by reference in its entirety. This source may also be used in other nonlinear optical processes such as difference frequency mixing, Raman scattering, anti-Stokes Raman scattering, and THz generation.

Further, operating the system in the regime where substantial spectral compression occurs in the Tm amplifier fiber 105 allows for even higher peak powers to be achieved. See, for example, U.S. Patent Publication 2005-0041702 A1 entitled "High Energy Optical Fiber Amplifier for Picosecond-nanosecond Pulses for Advance Material Processing Applications," which is incorporated herein by reference in its entirety. Spectral compression induces a decrease in signal bandwidth in the presence of self-phase modulation. For spectral compression to be effective in a Tm amplifier fiber 105 operating in the negative dispersion regime, negatively chirped pulses can be injected into the Tm fiber. In the configuration in FIG. 7, negatively chirped pulses can be obtained by transmitting the Raman-shifted pulses through an additional length of negative dispersion stretcher fiber 104 resulting in pulse lengths of 1 to 5 ps. Alternatively, the front end of the Tm-amplifier 105 is generally highly dispersive, also producing negatively chirped pulses with pulse lengths of 1 to 5 ps.

Moreover, in the 2 μm wavelength range, the peak Raman gain wavelength is red-shifted by nearly 200 nm from the peak of any signal wavelength amplified in Tm fiber. Hence, any Raman signal will have much less gain in Tm amplifier and more passive transmission loss that in general increases for longer wavelengths. Accordingly, stimulated Raman scattering can be effectively suppressed even in the presence of large peak power signals. Using spectral compression narrow band optical signals (with a bandwidth of about 0.1-20 nm) with peak power levels in excess of about 100 kW can thus be generated for pulses with a width of about 100 fs-1 ns.

Optionally, the output from the apparatus shown in FIG. 7, which is at about 1.55 to 2 μm can be frequency doubled to produce tunable pulses at about 1 μm. Such an arrangement is shown separately in FIG. 8. The system largely comprises the optical elements of in the embodiment shown in FIG. 7, with the addition of a QPM frequency doubler 108 and lenses 107 and 109. Accordingly, the description of elements 100, 101, 102, 103, 104, 105 and 106 present above with reference to in FIG. 7 is directly applicable to the respective elements in the embodiment illustrated in FIG. 8, except as noted below.

Figure 8:
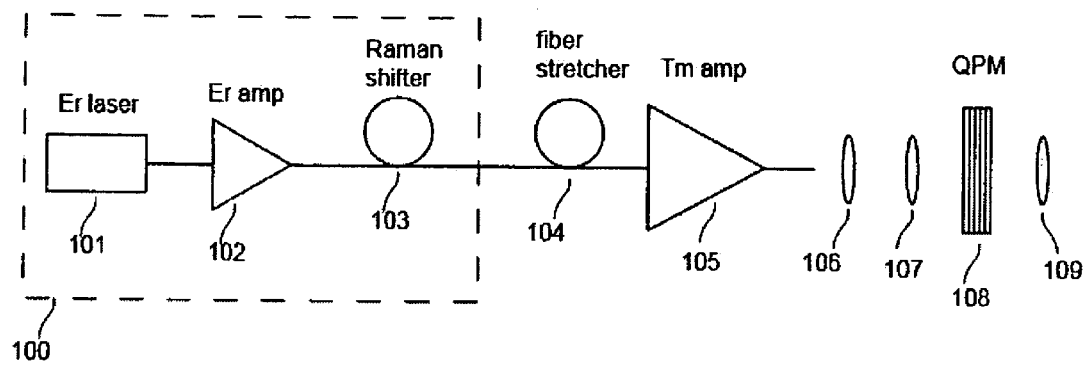
FIG. 8 is an illustration of another embodiment the a compact, tunable, fiber based source comprising a Tm fiber amplifier wherein frequency doubling of compressed amplified pulses produces ultrashort pulses in the wavelength range of about 900 to 1050 nm.

The output of the Tm amplifier 105 is coupled to the frequency doubler 108 with the lens arrangement represented in FIG. 8 by lenses 106 and 107. The generated doubled compressed pulses are collimated with lens 109. The focal lengths of lenses 106, 107, and 109 are chosen to provide optimum beam sizes in the doubling crystal and in free space. Other optical designs for directing the light beam exiting the Tm amplifier 105 through the QPM frequency doubler 108 may be used. For example, instead of two lenses 106 and 107, a one lens arrangement can be used.

The fiber stretcher 104 may or may not produce bandwidth limited pulses, for example, pulse lengths can range from about 1 ps to 1000 ps. Optionally, for example, if the embodiment shown in FIG. 8 is used as an OPA pump 200 such as shown in FIG. 4, the dispersion and/or length of the fiber stretcher 104 (or the dispersion an FBG used in place of the fiber stretcher 104 as discussed above) can be chosen to generate pulses at the output of the embodiment shown in FIG. 8 that are not bandwidth limited but rather have length to facilitate matching to the pulses generated by the continuum fiber 210 in the embodiment shown in FIG. 4. The dispersion of the fiber stretcher 104 may therefore provide group delay between about 1 ps and 1000 ps in certain embodiments depending on the configuration. Values outside these ranges, however, are possible.

In some embodiments, the frequency doubler 108 is implemented with PPLN whose length and QPM period are chosen to satisfy the phase-matching conditions for the conversion of the amplified pulses. Other QPM materials can also be used. Optionally, birefringently-phase-matched materials can be used. For pulses output from the amplifier 105 having lengths of about 100-200 fs and energies exceeding about 5-10 nJ, the doubling efficiency of about 25-50% can be obtained but is not limited to these ranges.

In one exemplary embodiment, up to about 1.8 W average power is obtained from the Tm amplifier 105, as discussed earlier for the embodiment shown in FIG. 7. In this embodiment, the frequency doubler 108 comprises a PPLN crystal having a length of about 0.5-mm which has multiple QPM grating segments with QPM periods ranging from about 25.5 to 28.7 μm. The crystal 108 is anti-reflection (AR) coated at both the fundamental and the second harmonic wavelengths. The output of the Tm-amplifier 105 is loosely focused through the crystal 108. After frequency doubling, about 530 mW power (about 5.3 nJ pulse energy) at about 997 nm is achieved, thus the SHG efficiency is about 23%. From the autocorrelation width of about 260 fs, FIG. 10(b), a pulse length of about 165 fs is estimated.

Hence, the system shown in FIG. 8 is capable of producing compressed pulses at about 1 μm wavelength with pulse lengths of about 100-200 fs, pulse energies exceeding about 2-5 nJ, and average powers exceeding about 200 mW at about 50-100 MHz repetition rates. These ranges are not limiting as, for example, the average power and the repetition rate can be increased further using the arrangement shown in FIG. 6 as described earlier.

The overall tunability of the system shown in FIG. 8 can be achieved by changing the gain of the amplifier 102 (and hence the pulse energy input to the Raman shifter 103) and appropriately adjusting the phase-mating condition of the doubling crystal 108. The latter can be accomplished, e.g., with temperature, angle-tuning and/or transverse translation of the doubling crystal 108. The discrete tuning with multigrating QPM crystals is also possible. As describe above, continuous tuning with uniform-period QPM gratings can be achieved with a fan-out grating arrangement; see, e.g., U.S. Pat. No. 6,359,914 issued to Powers et al, which is incorporated herein by reference in its entirety.

Figure 11:
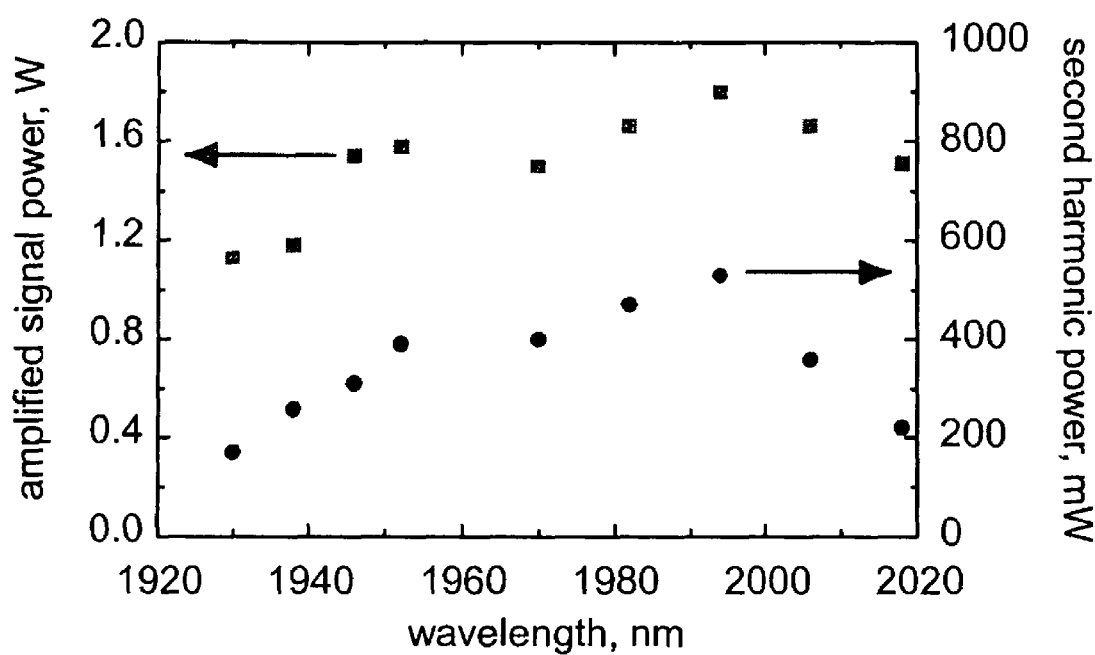
FIG. 11 plots the amplified signal power levels at about 2 $\mu m$ and the corresponding frequency-doubled power obtained when the output of the Tm amplifier in the embodiment illustrated in FIG. 8 is tuned to different wavelengths.

In an exemplary embodiment such as shown in FIG. 7, tuning of the amplified signal in the range between about 1930-2018 nm is achieved. FIG. 11 shows the amplified signal power and the corresponding frequency-doubled power as functions of wavelength in the range between about 1930-2018 nm when the amplifier was pumped with about 26 W coupled power. Values outside these ranges are also possible.

Figure 12:
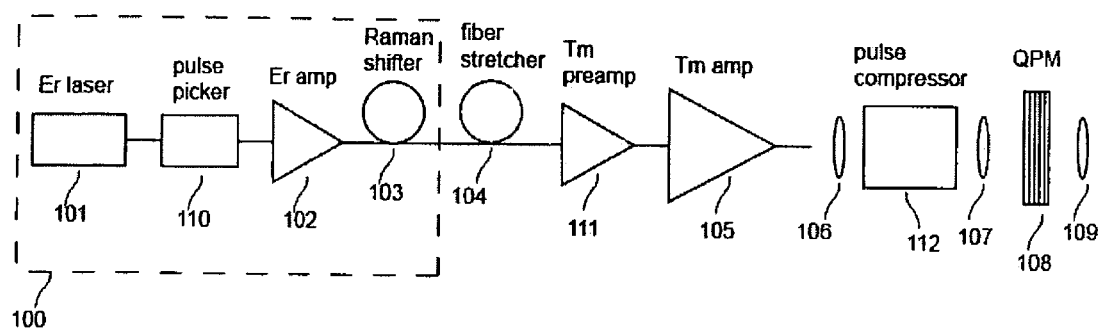
FIG. 12 is an illustration of an embodiment in which a pulse picker, a preamplifier, and a pulse compressor at the amplification wavelength are added to the embodiment shown in FIG. 8.

To produce compressed (e.g., bandwidth limited or nearly-bandwidth limited) tunable pulses with pulse energies exceeding about 200 nJ at about 2 μm wavelength from the Tm amplifier 105 and pulse energies exceeding about 100 nJ at about 1 μm wavelength from the QPM frequency doubler 108, the pulses input to the Tm amplifier 105 can be stretched to longer than about 5-20 ps to stay below the peak power limit of the amplifier. Compressing such long chirped pulses with a chirped QPM compressor, however, may be beyond the group delay limit available from a crystal of practical length. An exemplary embodiment for generation such compressed pulses output from the frequency doubler 108 at about 1 μm with pulse energies exceeding about 100 nJ is shown in FIG. 12. This embodiment is largely similar to the embodiment shown in FIG. 8, however, a pulse compressor 112 has been added. Accordingly, the description of the optical elements 100, 101, 102, 103, 104, 105, 106, 107, 108 and 109 with reference to the embodiment shown in FIG. 8, is directly applicable to the respective elements in the embodiment illustrated in FIG. 12, except as noted below.

An optional pulse picker 110 is also inserted in the system shown in FIG. 12 after the oscillator 101. A pulse picker may comprise an optical modulator such as an acousto-optic or an electro-optic modulator. Further, pulse pickers may optionally be inserted in later amplifier stages to also suppress the build-up of amplified spontaneous emission in the amplifiers allowing for a concentration of the output power in high energy ultra-short pulses. Such additional optical pulse pickers can be inserted, for example, between successive fiber amplifier stages and are not separately shown in FIG. 12. The pulse pickers down-count the repetition rate of the pulses emerging from the oscillator 101 by a given value (e.g. from 50 MHz to 100 kHz) and thus allow the generation of much higher pulse energies while the average power remains small. Optionally, the pulse picker 110 can be placed after the amplifier 102, after the Raman fiber 103 or after the dispersion control fiber 104. Other designs are also possible.

In certain embodiments, the length of the fiber stretcher 104 is chosen to stretch pulses to pulse lengths greater than about 5 ps, and possible greater than about 20 ps. Values outside these ranges are possible. Alternatively, a linearly- or nonlinearly-chirped FBG can be used in place of the fiber stretcher 104 as described above.

To compensate for an additional insertion loss of the pulse picker and to increase the average power input to the Tm amplifier 105, an optional Tm-doped fiber pre-amplifier 111 may be disposed in the system before the amplifier 105 as shown in FIG. 12. The pre-amplifier 111 may be placed after the Raman fiber 103 and before the fiber stretcher 104. Optionally, an optical isolator is inserted between the pre-amplifier 111 and the amplifier 105. The pre-amplifier 111 may comprise a single-mode Tm-doped double-clad fiber. Optionally, the pre-amplifier 111 comprises LMA Tm-doped fiber. The pre-amplifier 111 may be a polarization maintaining (PM) gain fiber. Other types of TM pre-amplifiers 11 may also be employed.

In one embodiment, the pre-amplifier 111 is pumped by power not absorbed in the amplifier 105. Optionally, a small portion of light used for pumping amplifier 105 is split before the amplifier 105 and used to pump the pre-amplifier 111. In other embodiments, a separate pump source can be used to pump the pre-amplifier 111. The pre-amplifier 111 may be cladding pumped through the side of the fiber; see., e.g., L. Goldberg et al., Optics Letters, 24, 673 (1999), which is incorporated herein by reference in its entirety. Optionally, the pre-amplifier 111 comprises single-mode fiber core-pumped with a single-mode fiber-coupled laser diode. Dual-wavelength pumping schemes can also be used to pump the pre-amplifier 111, see, e.g., Gomes et al, Optics Letters, vol. 28, 2003, pp. 334-336, which is incorporated herein by reference in its entirety. Other configurations are possible as well.

The stretched amplified pulses output from the amplifier 105 are directed to the pulse compressor 112 which may a bulk diffraction grating arrangement with the optics suitable for operation at about 2 µm wavelength. Other pulse compressor designs may also be used. For example, a very compact compressor can be build using a bulk piece of dispersive material; see, e.g., U.S. Pat. No. 6,272,156, entitled "Apparatus for Ultrashort Pulse Transportation and Delivery," issued to Reed et al, which is incorporated herein by reference in its entirety. Traversing light through such piece of material in a zigzag fashion allows accumulation of up to several picoseconds of group delay.

In certain embodiments, to achieve compressed pulses at about 2 µm wavelength with energies approaching 1 µJ and higher, pulses are stretched to about 10 ps-1 ns to stay below the peak power limit of the Tm amplifier 105. For such large stretching ratios, the third- and higher-order dispersion terms of the bulk grating compressor become non-negligible and may not be successfully compensated for with simple fiber stretchers or linearly-chirped fiber Bragg gratings resulting in compressed pulse quality deterioration. A nonlinearly-chirped FBGs, however, can be designed appropriately to compensate for third- and higher-order dispersion in the system, which can be used to achieve nearly bandwidth-limited pulses at the output of the compressor. See U.S. patent application Ser. No. 10/608,233, published as U.S. Patent Publication 2004/0263950, which is hereby incorporated herein by reference in its entirety.

A particularly compact compressor can be built using photonic bandgap fiber; see U.S. Provisional Patent Application No. 60/539,110, which is incorporated herein by reference in its entirety. Using photonic bandgap fiber as the compressor 112 (e.g., properly fabricated to have the bandgap at about 2 µm wavelength), a pulse energy exceeding about 100 nJ can be achieved at about 2 µm wavelength. Because the dispersion of such photonic bandgap fibers has large contributions of third- and higher-order terms, a dispersion tailored nonlinearly-chirped fiber grating may be used for stretching the pulses prior to amplification to obtain compressed pulses close to the bandwidth limit.

Alternatively, the compressor 112 can be implemented with a volume Bragg grating; see, e.g., U.S. Pat. No. 5,499,134, the contents of which are incorporated here by reference in their entirety. Still other configurations and designs not specifically recited herein are also possible.

The output of the pulse compressor 112 is coupled to the doubling crystal 108. Instead of the doubling crystal, any other nonlinear crystal may be incorporated as previously described with respect to FIG. 7. More than one nonlinear crystal may also be used, allowing for the inducement of a variety of complex nonlinear processes. Other variations are also possible.

The overall system tunability as described with reference to FIG. 8 is also applicable to the embodiment illustrated in FIG. 12. Depending on the type of compressor 112 used, however, the compressor may be tuned using different methods.

For example, in case where the compressor 112 is implemented using a bulk diffraction grating arrangement and the pulses are stretched to shorter than about 100 ps, the diffraction grating angle can be adjusted to achieve tunable outputs. In case the compressor 112 is implemented with a bulk diffraction grating arrangement and the pulses are stretched to longer than about 100 ps, the relative magnitude of second- and higher-order dispersion may change substantially when the wavelength is tuned over a broad band and the diffraction grating angle is adjusted accordingly. To somewhat compensate for such changes, the nonlinearly-chirped FBG 104 can be adjusted either by changing its temperature or by stretching.

In case the compressor 112 is implemented with the arrangement based on photonic bandgap fiber, the relative magnitude of second- and higher-order dispersion may change substantially when the wavelength is tuned over a broad band. To somewhat compensate for such changes, the nonlinearly-chirped FBG 104 can be adjusted either by changing its temperature or by stretching. Other approaches may also be employed for tuning.

Optionally, if the embodiment shown in FIG. 12 is used a an OPA pump 200, such as shown in FIG. 4, the dispersion of the fiber stretcher 104 (or the dispersion of an FBG used in place of the fiber stretcher 104 as discussed above) and the dispersion of the pulse compressor 112 can be chosen to generate pulses at the output of the frequency doubler 108 shown in FIG. 12 that are not bandwidth limited. Rather the pulse length of these output pulses may be selected to facilitate matching to the pulses generated by the continuum fiber 210 shown in FIG. 4.

Optionally, if the compressed pulses with pulse energies greater than about 200 nJ are desired at about 2 µm, the doubling crystal 108, lenses 107 and 109 can be omitted from the embodiment shown in FIG. 12. Other configurations are also possible.

Figure 13:
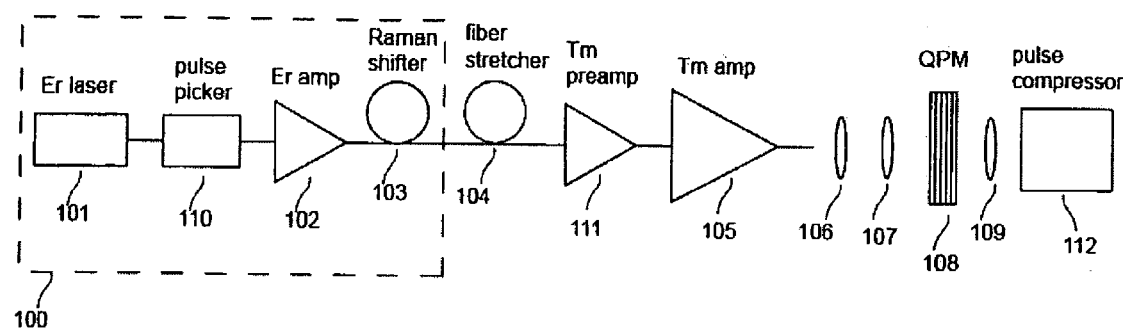
FIG. 13 is an illustration of an embodiment in which a pulse picker, a preamplifier, and a pulse compressor at the frequency doubled wavelength are added to the embodiment shown in FIG. 8.

An alternative embodiment for generation of compressed pulses at about 1 µm wavelength with pulse energies exceeding about 100 nJ is shown in FIG. 13. Compared to the embodiment shown in FIG. 12, in the embodiment shown in FIG. 13 the compressor 112 is placed after the doubling crystal 108. In this embodiment, the stretcher 104 operates at twice the wavelength at which the compressor 112 is operating; see, e.g., U.S. Pat. No. 5,847,863 entitled "Hybrid Short-Pulse Amplifiers with Phase-Mismatch Compensated Pulse Stretchers and Compressors," issued to Galvanauskas et al, which is incorporated herein by reference in its entirety. Description of the elements from the embodiment illustrated in FIG. 12, is applicable to the respective elements in the embodiment illustrated in FIG. 13, except as noted below. In case the compressor 112 is implemented with the bulk diffraction grating arrangement, the optics in the compressor 112 may be optimized to operate near 1 µm wavelength. In case the compressor 112 is implemented with a photonic bandgap fiber, the photonic band gap fiber may be fabricated to have the bandgap near 1 µm wavelength. Other configurations are possible.

Alternatively, in the embodiments shown in FIG. 12 and FIG. 13, a chirped QPM doubler can be used as the doubler 108 to provide partial compression of the pulses stretched by the stretcher 104 with the remainder of the compression provided by the pulse compressor 112 in certain embodiments. Chirped QPM doublers are described above, for example, with reference to FIG. 5. Such embodiments have a particular advantage for generation of compressed pulses at about 1 μm with pulse energies exceeding about 100 nJ. A chirped QPM doubler can be fabricated to compensate for the third- and higher-order terms of the compressor 112 (as implemented, e.g., either with a bulk diffraction grating arrangement or a photonic bandgap fiber) so that a nonlinearly-chirped FBG stretcher in place of element 104 is not needed and a simple linearly chirped FBG or a fiber stretcher may be used. Partial QPM compressors may be used. See, e.g., U.S. Pat. No. 6,198,568 B1 Galvanauskas et al., which is incorporated herein by reference in its entirety. Other variations in the designs and configurations are possible.

A limitation with Tm fiber amplifiers is a possibility of cross relaxation; see, e.g., S. Jackson, Opt. Comm. 230 (2004) pp. 197-203, which is incorporated herein by reference in its entirety. Though cross relaxation can enable the construction of ultra-efficient Tm fiber lasers, cross relaxations can reduce the amount of achievable gain in Tm amplifiers and greatly reduce the efficiency of the amplifier. Because of the relatively strong absorption of the signal light in silica Tm amplifiers near 2 μm, the low gain of Tm amplifiers cannot be compensated by an increase in Tm amplifier length. In order to overcome the efficiency limitations of Tm amplifiers in the presence of cross relaxations, double-pass Tm amplifiers can thus be implemented, so that the input signal coupled through the same side of the fiber as the pump experiences gain during the first pass. Such double pass Tm amplifiers can be implemented, for example, in conjunction with the embodiments shown in FIG. 5, FIG. 7, FIG. 8, FIG. 12, and FIG. 13.

The construction of double-pass amplifiers is straightforward and can comprise the combination of a length of Tm amplifier with a Faraday rotator mirror and a polarization beam splitter. In an exemplary implementation, light is passed through the polarization beam splitter, coupled into the Tm amplifier and amplified, reflected by the Faraday rotator mirror, amplified again by the Tm amplifier and eventually extracted with its polarization state rotated by 90° by the polarization beam splitter. Alternatively, a non-polarization rotating mirror can be implemented and the polarization state can be rotated by 90° by adjusting the polarization state in the Tm amplifier by appropriate polarization controllers or additional waveplates inserted into the beam path anywhere between the polarization beam splitter and mirror. Equally, more than two passes can be implemented through such low gain Tm amplifiers using additional Faraday rotators, polarization beam splitters and polarization manipulating waveplates.

Instead of the Raman-shifted Er fiber laser seeder block 100 shown, for example, in FIG. 5, FIG. 7, FIG. 8, FIG. 12, and FIG. 13, a mode-locked Tm fiber oscillator, which may be ultra-compact, can be incorporated to further simplify the system configuration, see, e.g., U.S. Pat. No. 5,666,373 entitled "Laser Having a Passive Pulse Modulator and Method of Making Same" issued to Sharp et al. and U.S. application Ser. No. 10/627,069 entitled "Polarization Maintaining Dispersion Controlled Fiber Laser Source of Ultrashort Pulses" filed by Fermann et al, which published as U.S. Patent Publication 2005/0018714, and which is incorporated herein by reference in its entirety. Fiber MOPAs may also be used; see, e.g., U.S. Patent Publication 2004/0,213, 302 A1, which is also incorporated herein by reference in its entirety. Mode-locked oscillators can conveniently use negative dispersion fiber, and negative or positive dispersion fiber gratings for output coupling. Unchirped FBGs can also be used for output coupling. These oscillators can be core or cladding pumped; see U.S. patent application Ser. No. 10/627,069 and U.S. Patent Application No. 60/519,447, which are incorporated herein by reference in their entirety. Mode locked oscillators may comprise saturable absorbers. A saturable absorber operating in the 2000 nm wavelength range can for example comprise GaInAsSb or AlAsSb grown on a GaSb or AlSb substrate. Appropriate ion implantation can be used with such saturable absorber designs to stabilize mode-locked operation. Alternatively, lead sulfide doped glass can be used as a saturable absorber in the 2000 nm wavelength range. See, e.g., P. T. Guerreiro et al, 'PbS quantum dot glasses as saturable absorbers for mode-locking of Cr:forsterite lasers', Appl. Phys. Lett., vol. 71, 1595-1597 (1997), which is incorporated herein by reference in its entirety. A variety of designs are possible. Other types of seed sources may be used as well.

Additional Optical Parametric Amplification Systems

Referring back to FIG. 4, the parametric amplification of the ultra broadband continuum employs the OPA pump 200 that uses SHG (via QPM crystal 108 shown in FIG. 8) of the amplified seed for pumping the QPM crystal 260 in the OPA system. Accordingly, the optical parametric amplification system benefits from the availability of the fiber gain material at twice the wavelength required for the OPA.

Figure 14:
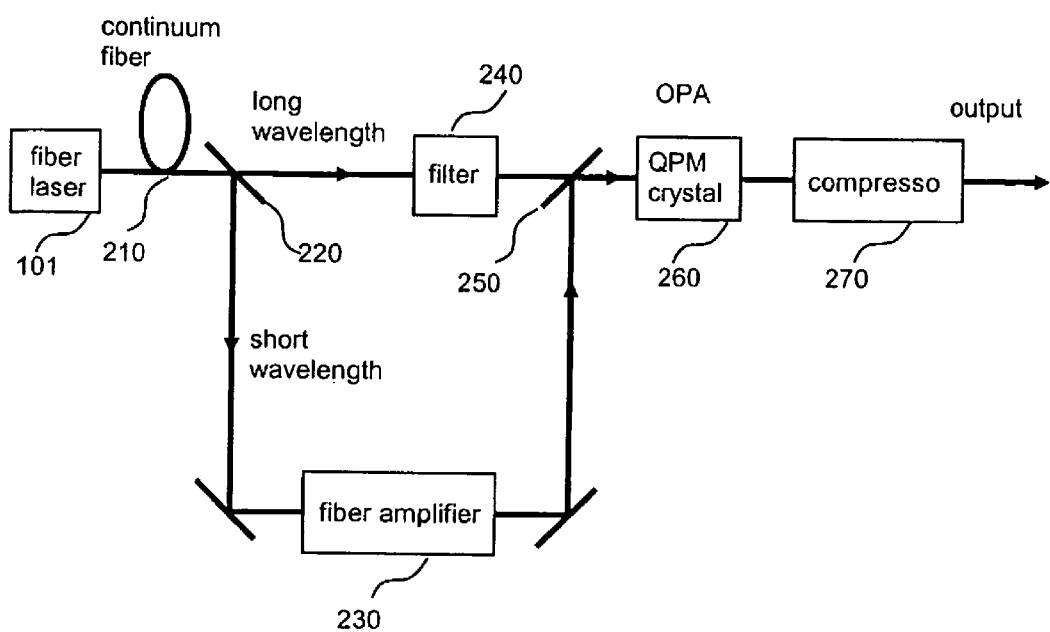
FIG. 14 is an illustration of another embodiment of a compact fiber based source of amplified ultra broadband pulses comprising a continuum fiber that produces a continuum, wherein a short-wavelength part of the continuum is used as a seed for the pump fiber amplifier used to pump the optical parametric amplifier (OPA).

An alternative embodiment of the ultra broadband OPA that relies on the fiber gain at the OPA pump wavelength is shown in FIG. 14. In this embodiment, a short-wavelength part of the continuum generated by the continuum fiber 210 is used for seeding a fiber amplifier 230, while a long-wavelength portion of the continuum is amplified downstream in the OPA crystal 260. Additional details regarding the elements 101, 210, 240, 250, 260, and 270 forming the OPA system are described above with reference to FIG. 4.

As described above, in this exemplified embodiment, the fiber laser 101 may comprise an Er gain fiber. Alternatively, the fiber laser may comprise other sources such as Yb gain fiber; see, e.g., U.S. Patent Application 60/519,447 which is incorporated herein by reference in its entirety. In certain embodiments, the continuum is broad enough to provide a short-wavelength seed for the amplifier 230 and a long-wavelength part to be amplified in the OPA 260. The beam splitter 220 may comprise a fused fiber wavelength-division-multiplexing (WDM) coupler. Alternatively, bulk short- or long-pass dielectric filters can be used, either in a fiber-coupled arrangement or incorporating separate bulk optics to couple light in and out of the fibers.

The fiber amplifier 230 can be implemented in a single- or multiple-stage arrangement. The gain fiber may comprise single-mode small core or large-mode-area (LMA) fiber configured to obtain predominantly fundamental mode output; see, e.g., U.S. Pat. No. 5,627,848 issued to Fermann et al. entitled "Apparatus for producing femtosecond and picosecond pulses from mode-locked fiber lasers cladding pumped with broad area diode laser arrays," which is incorporated herein by reference in its entirety. Alternatively, a LMA microstructured (holey) fiber can be used. The amplifier may comprise polarization-maintaining (PM) fiber. Alternatively, non-PM fiber can be used in a single-pass arrangement or in a double-pass configuration with a Faraday rotator mirror and a polarizing beam splitter. Optionally, the amplifier is preceded by polarization control elements such as bulk waveplates or their fiberoptic counterparts to facilitate coupling along a principal axis of the amplifier. The amplifier may be followed by polarization control elements such as bulk waveplates or their fiberoptic counterparts to prepare the polarization state appropriate for pumping the OPA.

In the exemplified embodiment where the OPA 260 comprises PPLN or other QPM nonlinear crystal that is to be pumped at about 930-970 nm to achieve the ultra broad OPA bandwidth, the fiber amplifier 230 may comprise a Nd-doped fiber utilizing a depressed cladding fiber design to avoid competition with the stronger 1060-1090 nm gain band.

Optionally, fiber amplifier 230 can be setup in a chirped pulse amplification (CPA) arrangement, incorporating a stretcher before the amplifier(s) and an optional compressor afterwards. The stretcher can be implemented with a length of transmission fiber or an FBG, as discussed above, for example, with reference to FIG. 12. The compressor can be implemented with a bulk diffraction grating arrangement, FBG, photonic bandgap fiber or a volume Bragg grating, as discussed above. For increase OPA, efficiency the pump pulses from the output of the amplifier 230 can be of approximately the same length as the continuum pulses to be amplified.

In certain embodiments, the amplifier 230 can incorporate a band-pass filter at the input to further narrow the spectrum after the beam splitter 220. Other types of amplifiers and other configurations and designs are also possible.

Figure 15:
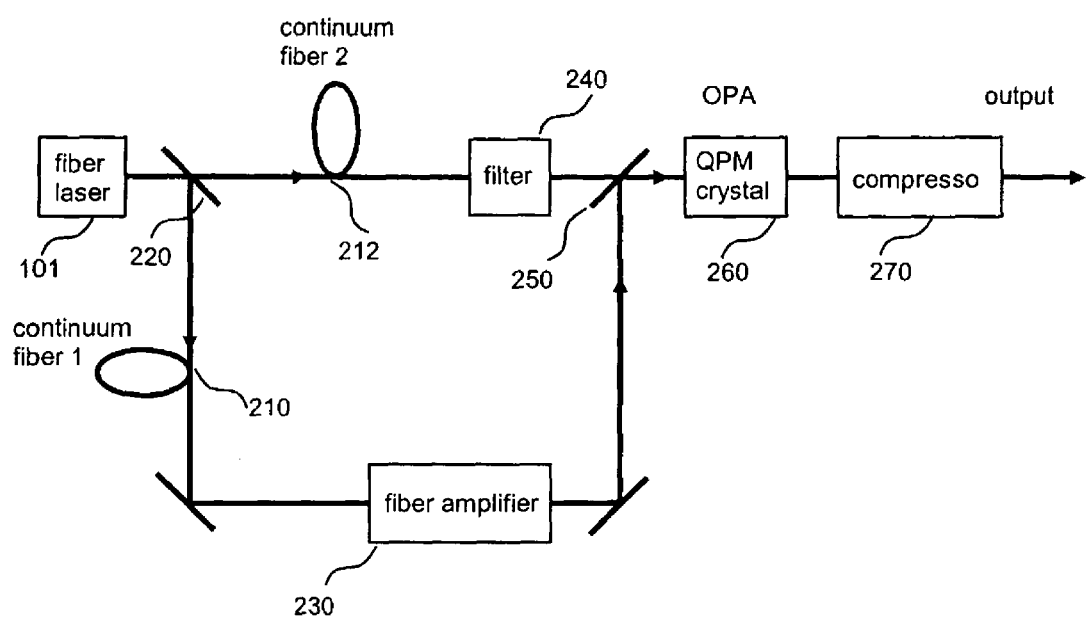
FIG. 15 is an illustration of another embodiment of a compact fiber based source of amplified ultra broadband pulses in which instead of one continuum fiber (as in embodiment illustrated in FIG. 14) two continuum fibers are used to separately optimize up-conversion and down-conversion processes.

An arrangement with a system using two sets of nonlinear fibers 210, 210 for continuum generation and amplification is shown in FIG. 15. This arrangement is similar to that shown in FIG. 14. The continuum fiber 210 is used to provide seed for pump wave amplification in fiber amplifier 230, whereas continuum fiber 212 is used to produce continuum to be amplified in the OPA 260, as discussed above.

In certain embodiments, the beam splitter 220 is predominantly non-wavelength selective across the bandwidth produced by the fiber laser 101. This beam splitter 220 may comprise a fused fiber coupler. Alternatively, bulk dielectric or metal-coated filters can be used for this purpose, either in a fiber-coupled arrangement or incorporating separate bulk optics to couple light in and out of the fibers.

Many of the element 101, 210, 230, 240, 250, 260 and 270 are described above in connection with FIG. 4 and FIG. 14. The long wavelength part of the continuum produced by fiber 210, however, need not be broad enough to seed the OPA 260.

Optionally, more continuum fibers may be used in addition to 210 and/or 212 can be used to produce continuum. Additional continuum fibers enable separate tailoring or optimization, e.g., portions of the continuum for amplification in the OPA as well as the anti-Stokes part of the continuum used for seeding the amplifier 230.

Embodiments for the ultra broad bandwidth OPA described above allow appreciable parametric gains to be achieved with modest pump pulse energies, e.g., of about 10-200 nJ. Additionally, the OPA can also be pumped at specific wavelengths as dictated by the dispersive properties of the QPM crystals used for OPA. Chirped QPM crystals can also be used to engineer the OPA bandwidth; see, e.g., U.S. Pat. No. 6,208,458 "Quasi-phase-matched Parametric Chirped Pulse Amplification Systems," issued to Galvanauskas, which is incorporated herein by reference in its entirety. For example, a chirped QPM crystal can be fabricated to provide an OPA bandwidth in excess of about 300 nm, for any pump wavelength, not limited by the intrinsic material dispersion. Compared to the uniform-grating QPM crystals, the use of chirped QPM crystals may utilize substantially higher pulse energies to achieve comparable parametric gains. These energy levels, however, are comparable or lower than the pulse energies required for pumping the ultra broadband OPA in BBO. Additionally, BBO needs to be pumped at a specific wavelength dictated by the dispersive properties.

In the embodiments described above, e.g., in reference to FIG. 4, FIG. 14, and FIG. 15, the ultra broadband OPA element 260 can be implemented with a chirped QPM crystal to provide ultra broadband OPA bandwidth. In this case, the system performance can be tailored or optimized for using well-developed gain fibers. These gain fibers may include Yb-doped fibers in the OPA pump element 200 in embodiment illustrated in FIG. 4 or in the fiber amplifier element 230 in embodiments illustrated in FIG. 14 and FIG. 15. Yb-doped amplifiers are described in U.S. patent application Ser. No. 09/576,772, which is incorporated herein by reference in its entirety.

As was discussed above, the use of QPM nonlinear materials for OPA generally allows for high parametric gains, exceeding 80 dB, when pumped by even low to moderate energy pulses (sub-nanojoules to tens of nanojoules) as available for example from fiber-based laser systems. Such high gains are enough to amplify quantum noise at the input of the optical parametric amplification (OPA) to macroscopic intensities, leading to optical parametric generation (OPG); see, e.g., A. Galvanauskas, M. A. Arbore, M. M. Fejer, M. E. Fermann, and D. Harter, "Fiber-laser-based femtosecond parametric generator in bulk periodically poled LiNbO$_3$" Optics Letters 22, (1997) p. 105-107, which is incorporated herein by reference in its entirety. The use of OPG in QPM materials when pumped by short pulses form a fiber-based system allows for a particularly compact source of ultra broadband pulses with pulse lengths comparable to that of the pump.

Optical Parametric Generation

Ultrabroadband OPA based on QPM materials as discussed herein, can also be used in the OPG configuration, i.e. using quantum noise as a seed for the ultra broadband OPA. As described above, the use of short optical pulses obtained from a fiber-based laser system for pumping such ultra broadband OPG allows for a particularly compact ultra broadband source.

Figure 16:
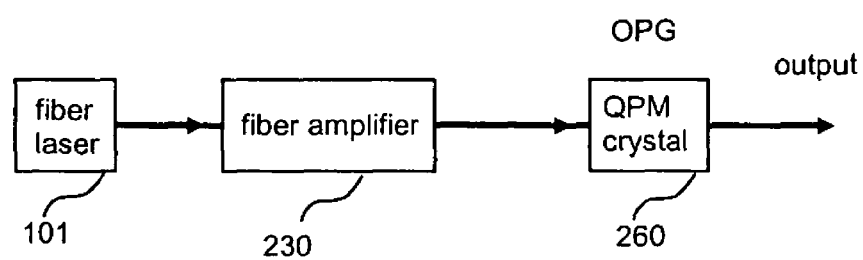
FIG. 16 is an illustration of a compact fiber based source based on ultra wideband optical parametric generation (OPG).

FIG. 16 illustrates an exemplary OPG system. The amplification system includes a short-pulse fiber laser 101 whose output is amplified by a fiber amplifier 230. Optionally if the oscillator output has pulse energy and peak power above the OPG threshold (i.e. capable of producing OPA gains of more than about 80 dB), the amplifier 230 can be omitted. The amplifier 230 is followed by bulk or micro-optic lens arrangement for coupling light from the fibers and focusing into a parametric generator 260.

Details regarding the fiber laser 101, amplifier 230, and optical parameteric generator 260 are described above. When using a suitable active fiber media for producing pump pulses at the wavelengths satisfying the ultra broadband OPG conditions or when the chirped QPM crystal is used for OPG, the system is particularly compact. Other configurations are also possible.

Figure 17:
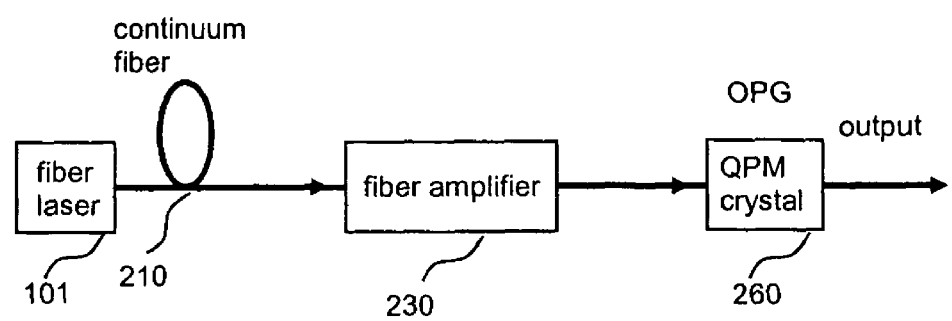
FIG. 17 is an illustration of another embodiment of a compact fiber based source based on ultra wideband optical parametric generation (OPG) where a spectrally-filtered portion of the continuum is used to seed a fiber amplifier that pumps the OPG.

FIG. 17 illustrates another embodiment of an OPG system. The arrangement shown in FIG. 17 is useful when generation of short optical pulses at the wavelength for pumping the ultra broadband OPG is difficult or impossible, but amplification still can be achieved. As shown in FIG. 17, the system includes a short-pulse fiber laser 101 whose output is directed to the continuum fiber 210. The output of the continuum fiber 210 is amplified by a fiber amplifier 230. The amplifier 230 is followed by bulk or micro-optic lens arrangement for coupling light from the fibers and focusing into the parametric generator 260.

The continuum is broad enough to provide adequate spectral intensity for seeding the amplifier 230 at the wavelength useful for pumping the ultra broadband OPG. Either the long- or a short-wavelength part of the continuum can be used for seeding the amplifier 230, depending on the wavelength of the fiber laser 101 relative to the wavelength required for pumping the ultra broadband OPG.

In certain embodiments, for example, the fiber laser 101 outputs optical pulses at about 1.55 μm, which are coupled into the continuum fiber 210. The continuum fiber 210 produces long and short wavelengths parts. The short wavelength part, referred to as the anti-Stokes wavelength at about 950 nm, is used to seed the fiber amplifier 230. Accordingly, these optical pulses at 950 nm are amplified and optically coupled into the QPM crystal 260 for pumping the OPG process.

Additional details regarding the fiber laser 101, continuum fiber 210, fiber amplifier 230, and QPM crystal 260 are described above. Other configuration may also be used.

Figure 18:
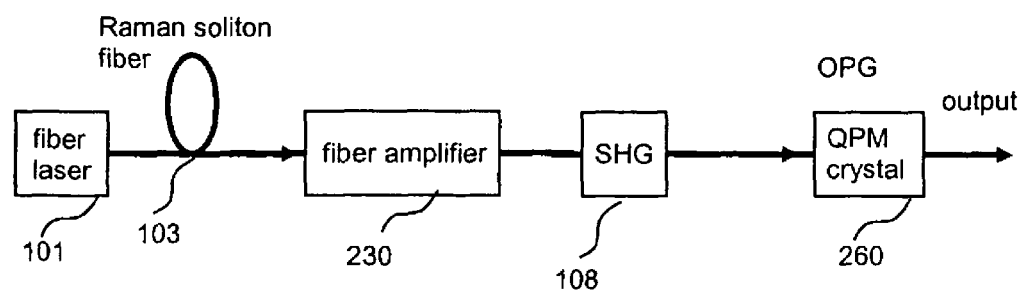
FIG. 18 is an illustration of another embodiment of a compact fiber based source using ultra wideband optical parametric generation (OPG) pumped by frequency-doubled amplified Raman shifted fiber oscillator.

FIG. 18 illustrates another OPG system. The arrangement shown in FIG. 18 is similar to that shown in FIG. 17, however, this system uses a Raman soliton fiber 103 and includes an additional SHG stage 108.

As shown in FIG. 18, the amplification system comprise a short-pulse fiber laser 101 whose output is directed to the Raman soliton fiber 103. Such long-wavelength shifted pulse is amplified by a fiber amplifier 230 and then frequency-doubled in SHG 108. The amplifier 230 is followed by bulk or micro-optic lens arrangement for coupling light from the fibers and focusing into the parametric generator 260. Additional details regarding these elements 101, 103, 230, 108, and 260 are provided above, e.g., in connection with FIG. 4 and FIG. 17.

In certain embodiments, the fiber laser outputs optical pulses having a wavelength of 1.5 μm. These optical pulse are coupled into the Raman soliton fiber up shifts the wavelength of the optical pulses to about 2.0 μm. These optical pulses having wavelengths of about 2.0 μm seed the fiber amplifier 230 and are amplified. The amplified pulses are directed into the SHG frequency doubler 108, which outputs optical pulses having a wavelength of about 950 μm. These optical pulses at about 950 μm are directed into the QPM crystal for pumping the OPG process. Other designs and configurations are also possible.

Laser systems producing ultrashort optical pulses with high pulse energies are useful for a wide variety of applications. For example, fiber lasers and amplifiers are promising candidates for ultrafast pulse sources for advanced industrial applications due to their unique simplicity of construction. Other uses are possible. A wide variety of embodiments described herein may be advantageously employed in such applications.

Embodiments described herein include a system for producing ultrashort tunable pulses based on ultra broadband OPA or OPG in nonlinear materials. In some embodiments, these nonlinear materials are periodically poled. To achieve ultra broadband OPA or OPG, the system parameters such as nonlinear material, pump wavelengths, QPM periods and temperatures can be selected appropriately to utilize the intrinsic dispersion relations for such material. As described above, in certain embodiments low-energy seed pulses to the ultra broadband OPA or OPG can be obtained from continuum generated in highly nonlinear fiber in a fiber-based laser system. Moderate pulse energy pump pulses having, for example, about 500 nJ or less, possibly 100 nJ or less, for the OPA or OPG can be obtained from a fiber-based laser source. The pulse energies for pumping the OPA or OPG can further be lowered by the use of nonlinear waveguide materials. Chirped QPM devices can also be employed to achieve ultra broadband OPA or OPG. Pulses compression may result in the output of pulses from the system that are compressed to about 10 times or less than the bandwidth limit, about 3 times or less than the bandwidth limit, or about 2 times or less than the bandwidth limit.

In certain embodiments, compact high average power sources of short optical pulses tunable in the wavelength range of about 1800-2100 nm and after frequency doubling in the wavelength range of approximately 900-1050 nm can be used as a pump for the ultra broadband OPA or OPG. These sources, however, are also useful for a variety of applications, including but not limited to micromachining, spectroscopy, nonlinear frequency conversion and two-photon microscopy. For two-photon microscopy applications, short optical pulses at about 960 nm are of particular interest because a number of fluorophores have been developed for this range, see for example Chen and Periasamy, Microscopy Research and Technique vol. 63, pp. 72-80, 2004, which is incorporated herein by reference in its entirety. In embodiments of the invention, the system is based on fiber technology allowing for compact and robust implementation as is advantageous for, e.g., industrial applications.

In certain embodiments, the short optical pulses are obtained from an Er fiber oscillator at about 1550 nm, amplified in an Er fiber, Raman-shifted to about 1800 to 2100 nm, stretched in a fiber stretcher, and amplified in a Tm-doped fiber. To produce short pulses in the approximately 900 to 1050 nm wavelength range, the pulses are frequency-doubled with a chirped QPM doubler for nearly bandwidth-limited output. Tunability is achieved by changing the pulse energy input to the Raman-shifter fiber and adjusting the phase-matching conditions in the frequency doubling crystal.

The efficiency of Tm amplifiers can be increased or optimized by employing double pass or multi-pass amplification through the Tm amplifiers. Multi-pass Tm amplifiers are particularly useful for increasing the efficiency of Tm amplifiers in the presence of cross relations. In various embodiments, instead of the Raman-shifted Er fiber laser, a Tm mode-locked fiber laser (oscillator-only or master-oscillator-power-amplifier configurations) can be used for seeding the Tm fiber amplifier.

In certain embodiments, the average power may be increased using a high repetition rate fiber oscillator and further time-division multiplexing the pulses to achieve even higher repetition rate operation. Compact laser systems utilizing pulse compression in the Tm amplifier fiber are also possible. A chirped pulse amplification system can be implemented based on compression with a bulk compressor and optional frequency doubling. Compact chirped pulse amplification system may be implemented with pulse stretching before the Tm amplifier and with a nonlinearly-chirped fiber grating and compression with a photonic bandgap fiber compressor before or after the optional frequency doubling stage.

Such short-pulse systems based on amplification in Tm fibers can be used for gas sensing, two-photon microscopy and micro-machining. In addition, such short-pulse systems based on amplification in Tm fibers can be employed for nonlinear frequency conversion like harmonic generation, wide bandwidth optical parametric generation, and other nonlinear processes with QPM materials. Other applications are possible.

While the above detailed description has shown, described, and pointed out novel features of the invention as applied to various embodiments, it will be understood that various omissions, substitutions, and changes in the form and details of the structures or methods illustrated may be made by those skilled in the art without departing from the spirit of the invention. A wide range of design, configurations, arrangements and uses are possible. As will be recognized, the present invention may be embodied within a form that does not provide all of the features and benefits set forth herein, as some features may be used or practiced separately from others.

What is claimed is:

1. A pulsed light source based on optical parametric amplification comprising:
    a seed source;
    a pump laser downstream from the seed source, configured to output optical pulses having a pulse width of about 10 nanoseconds or less; and
    a nonlinear periodically poled crystal with a substantially uniform poling period, wherein said crystal comprises lithium-niobate, KTP, periodically-twinned quartz, RTA, lithium tantalate, or potassium niobate,
    wherein said optical pulses from said pump laser pump said nonlinear crystal, said non-linear crystal configured as an optical parametric amplifier (OPA) having a small signal gain bandwidth of at least about 200 nm.

2. The pulsed light source of claim 1, further comprising a fiber amplifier optically coupled to said pump laser so as to receive and amplify said optical pulses for pumping said nonlinear crystal.

3. The pulsed light source of claim 1, further comprising:
    a Raman shifting fiber optically coupled to said pump laser and configured to shift the wavelength of said optical pulses output by said pump laser; and
    a frequency doubler optically disposed to receive said wavelength shifted optical pulses and configured to increase the frequency of said wavelength shifted optical pulses, said wavelength shifted optical pulses pumping said periodically poled nonlinear crystal to produce optical parametric generation.

4. The pulsed light source of claim 1, said non-linear crystal being controlled with a substantially fixed temperature, operating with a substantially fixed poling period, and emitting output radiation at signal and idler wavelengths in a wavelength range at which said crystal is transmissive, said wavelength range spanning at least one octave.

5. The pulsed light source of claim 4, wherein the variation in pump wavelength is less than about 1% of said pump wavelength.

6. The pulsed light source of claim 1, wherein output pulses of said pump laser comprises a wavelength in the range of about 0.9 µm to about 1 µm.

7. The pulsed light source of claim 6, wherein said poling period of said nonlinear crystal and wavelength of said pump pulses are configured such that amplified signal pulses and idler pulses are emitted at approximately equal wavelengths.

8. The pulsed light source of claim 1, wherein said non-linear crystal emits output radiation at signal and idler wavelengths that are approximately equal.

9. A pulsed light source based on optical parametric amplification comprising:
    a pump fiber amplifier generating optical pump pulses;
    a continuum source generating broadband optical pulses having a bandwidth between approximately 40 nm and 2000 nm at an output of said continuum source; and
    a nonlinear crystal that receives said optical pump pulses from said pump fiber amplifier and said broadband optical pulses from said continuum source, said pulsed light source configured such that said optical pump pulses and said broadband pulses from said continuum source propagate along separate optical paths at a time prior to being received by said nonlinear crystal, said broadband optical pulses from said continuum source being amplified by optical parametric amplification in said nonlinear crystal,
    wherein said optical pulses from said pump fiber amplifier and said broadband optical pulses from said continuum source are derived from a common laser source, thereby providing substantial time synchronization between said pump fiber amplifier and said continuum source.

10. The pulsed light source of claim 9, wherein said pump fiber amplifier comprises Nd-doped amplifying fiber, Yb-doped amplifying fiber, Er-doped amplifying fiber, Er/Yb-doped amplifying fiber, Tm-doped amplifying fiber or Ho-doped amplifying fiber.

11. The pulsed light source of claim 9, wherein said optical pulses from said pump fiber amplifier and said broadband optical pulses from said continuum source have substantially the same pulse width.

12. The pulsed light source of claim 9, wherein said optical pulses from said pump fiber amplifier and said broadband optical pulses from said continuum source have pulse widths that differ by no more than about a factor of ten.

13. The pulsed light source of claim 9, wherein said optical pulses from said pump fiber amplifier and said broadband optical pulses from said continuum source substantially overlap in time.

14. The pulsed light source of claim 9, wherein said optical pulses from said pump fiber amplifier and said broadband optical pulses from said continuum source overlap, said overlap comprising at least about 10% of the pulse duration of said broadband optical pulses from said continuum source.

15. The pulsed light source of claim 9, wherein said continuum source comprises a non-linear fiber.

16. The pulsed light source of claim 9, wherein said pump fiber amplifier is seeded with a short wavelength portion of a fiber continuum source.

17. The pulsed light source of claim 9, wherein said nonlinear crystal has a substantially uniform poling period.

18. The pulsed light source of claim 9, wherein said pulsed light source is operated about a point of degeneracy.

19. The pulsed light source of claim 9, wherein said common laser source comprises a single source located upstream from said pump fiber amplifier and said continuum source.

20. The pulsed light source of claim 9, wherein said common laser source comprises a fiber laser.

21. The pulsed light source of claim 20, wherein at least one pulse output from said fiber laser has a bandwidth of between approximately 2 nm and approximately 40 nm.

22. The pulsed light source of claim 9, wherein said non-linear crystal is configured as an optical parametric amplifier (OPA) having small signal gain bandwidth of at least about 200 nm.

23. The pulsed light source of claim 9, wherein said continuum source comprises a highly non-linear fiber.

24. The pulsed light source of claim 9, wherein pulses output by said non-linear crystal have a pulse duration in the range from approximately 30 fs and approximately 1000 ps.

25. The pulsed light source of claim 9, further comprising a pulse compressor downstream from said non-linear crystal, and configured to compress pulses to a pulse width between approximately 3 fs to approximately 300 fs.

26. The pulsed light source of claim 9, wherein said continuum fiber is configured to output optical pulses having wavelengths in the range from approximately 1.1 µm to approximately 2.5 µm.

27. The pulsed light source of claim 26, further comprising an optical filter downstream from said continuum source and upstream from said nonlinear crystal, said optical filter configured to remove light at about 1900 nm.

28. The pulsed light source of claim 26, further comprising an optical filter downstream from said continuum source and upstream from said nonlinear crystal, said optical filter configured to remove light below 1900 nm.

29. The pulsed light source of claim 26, further comprising an optical filter downstream from said continuum source and upstream from said nonlinear crystal, said optical filter configured to remove light above 1900 nm.

30. A pulsed light source based on optical parametric amplification, comprising:
an optical pump source generating pump pulses;
a seed source; and
a nonlinear periodically poled crystal that receives optical pump pulses from said optical pump source and optical pulses from said seed source, said pulsed light source configured such that said pump pulses and said pulses from said seed source propagate along separate optical paths at a time prior to being received by said nonlinear crystal, said optical pulses from said seed source being amplified by optical parametric amplification in said nonlinear crystal, wherein said non-linear crystal is configured as an optical parametric amplifier (OPA) having a small signal gain bandwidth of at least about 200 nm;
wherein said optical pump source and said seed source are configured to provide substantial optical synchronization between optical pulses from said optical pump source and said optical pulses from said seed source, and
wherein said nonlinear crystal has a substantially uniform poling period.

31. A pulsed light source according to claim 30, wherein said nonlinear crystal comprises periodically poled lithium-niobate, periodically poled KTP, periodically poled quartz, periodically poled RTA, periodically poled lithium tantalate, periodically poled potassium niobate or orientation patterned GaAs.

32. The pulsed light source of claim 31, wherein the crystal poling period of said nonlinear periodically poled crystal and wavelength of said pump pulses are configured such that amplified signal pulses and idler pulses are emitted at approximately equal wavelengths.

33. The pulsed light source of claim 30, wherein the pulsed light source is operated about a point of degeneracy of said nonlinear crystal.

34. The pulsed light source of claim 30, wherein the optical pump source comprises a fiber amplifier.

35. A pulsed light source based on optical parametric amplification comprising:
an optical pump source;
a secondary seed source comprising a nonlinear fiber;
a primary seed source located upstream of said secondary source and said optical pump source, said primary seed source further configured to seed the secondary seed source and the optical pump source, such that said optical pump source and secondary seed source are substantially synchronized in time; and
a nonlinear periodically poled crystal having a uniform poling period, said crystal receiving optical pulses from said optical pump source and optical pulses from said secondary seed source, said pulsed light source configured such that said pump pulses and said pulses from said secondary seed source propagate along separate optical paths at a time prior to being received by said nonlinear crystal, said nonlinear crystal producing spectral emission as a result of optical parametric amplification, said spectral emission having a spectral range exceeding a width of about 200 nanometers.

36. The pulsed light source of claim 35, wherein said primary source comprises an optical fiber.

37. The pulsed light source of claim 35, wherein said nonlinear crystal comprises periodically poled lithium-niobate, periodically poled KTP, periodically poled quartz, periodically poled RTA, periodically poled lithium tantalate, periodically poled potassium niobate or orientation patterned GaAs.

38. The pulsed light source of claim 35, wherein the pulsed light source is operated about a point of degeneracy such that amplified signal pulses and idler pulses are emitted at approximately equal wavelengths.

39. The pulsed light source of claim 35, wherein the optical pump source comprises a fiber amplifier.

* * * * *

UNITED STATES PATENT AND TRADEMARK OFFICE
CERTIFICATE OF CORRECTION

PATENT NO. : 8,040,929 B2
APPLICATION NO. : 11/091015
DATED : October 18, 2011
INVENTOR(S) : Gennady Imeshev et al.

It is certified that error appears in the above-identified patent and that said Letters Patent is hereby corrected as shown below:

In column 1 line 23, change "for," to --for--.

In column 6 line 1, change "point" to --point),--.

In column 6 line 2, after "0" insert --.--.

In column 17 line 25, change "to," to --to--.

In column 21 line 2, change "11" to --111--.

In column 32 line 31, In Claim 36, change "source" to --seed source--.

Signed and Sealed this
Tenth Day of July, 2012

David J. Kappos
*Director of the United States Patent and Trademark Office*